United States Patent Office 3,301,824
Patented Jan. 31, 1967

---

3,301,824
POLYMERS OF CYCLIC CARBONATES
Fritz Hostettler and Eugene F. Cox, Charleston, W. Va., assignors to Union Carbide Corporation, a corporation of New York
No Drawing. Filed Sept. 26, 1963, Ser. No. 311,674
17 Claims. (Cl. 260—77.5)

This invention relates to processes for polymerizing cyclic carbonates and to the products resulting therefrom. In a broad aspect, the invention is directed to processes for polymerizing monomeric cyclic carbonates in contact with various catalysts to produce useful polymers of said carbonates which contain a plurality of carbonate, i.e.,

groups in the essentially linear polymeric chain thereof. The average molecular weights of the resulting polymers can range from about a few hundred to the low millions, e.g., from about 500 to about 500,000, and higher. The relatively high molecular weight polymers prepared by the practice of the invention are highly useful products as will become apparent at a later section herein. In addition, the polymerization reactions can be conducted at lower temperatures and at faster polymerization rates heretofore unattainable in this art. It is pointed out at this time that the terms "polymer(s)" or "polymeric," as used herein including the appended claims refers to the reaction products resulting from the polymerization or interaction of one or more polymerizable monomers. In this respect, the term "polymer" is employed in its generic sense. It is also pointed out that the term "copolymer," as used herein including the appended claims, refers to the reaction products resulting from the polymerization or interaction of two or more polymerizable monomers.

Accordingly, one or more of the following objects will be achieved by the practice of this invention.

It is an object of the invention to provide a novel process for homopolymerizing monomeric cyclic carbonates to produce novel and useful homopolymers. It is another object of the invention to provide a novel process for polymerizing an admixture containing at least two monomeric cyclic carbonates to produce novel and useful polymers. Another object of the invention is to provide a novel process for polymerizing an admixture containing at least one cyclic carbonate and at least one cyclic ester to produce various novel and useful polymers. A further object of this invention is to prepare novel polymers having a high degree of utility and application in the molding, coating, fiber, film, plasticizing, etc., fields. A yet further object of the invention is to provide novel polymers, the properties and characteristics of which can be "tailor-made" to fit a wide variety of uses and fields of applications. Other objects will become apparent to those skilled in the art in the light of the instant specification.

In one embodiment, illustrative of the cyclic carbonate monomers which are contemplated are those which are free from ethylenic and acetylenic unsaturation. The cyclic monomers are characterized in that they contain at least 6 atoms (and upwards to 21 atoms), preferably 6 atoms, in the ring nucleus which possesses the carbonate group, i.e.,

and especially, those in which the ring nucleus is composed of carbon and oxygen, said oxygen being present in the form of the carbonate group,

Etheric oxygen can also be present in said nucleus. The cyclic carbonate monomers are further characterized in that they contain no more than four substituents or groups bonded to the carbon atoms of the ring nucleus which contains the carbonate group. In a preferred aspect, these cyclic carbonate monomers are characterized in that (a) they possess the 1,3-dioxane-2-one nucleus, (b) they contain no more than 3 substituents bonded to the carbon atoms of said nucleus, and (c) both ring carbon atoms which are alpha to the oxygen atoms of the carbonate group contain no more than one substituent on each of said carbon atoms. The cyclic carbonate monomers which are composed of (1) carbon, hydrogen, and oxygen atoms, or (2) carbon, hydrogen, oxygen, and nitrogen atoms, said nitrogen atoms being in the form of nitro, tertiary amino, cyanoalkoxymethyl, or cyanoalkyl (NCR—) groups represent further preferred classes. In this respect, the oxygen is always present in the form of the carbonate group,

and etheric oxygen (—O—), esteric oxygen

and/or nitro oxygen (—NO$_2$) may also be present in the carbonate molecule.

Among the exemplary cyclic carbonate compounds are those depicted by the following formula:

(I)

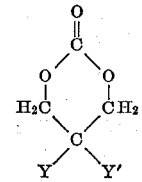

wherein Y and Y' are monovalent groups which are free of ethylenic and acetylenic unsaturation. To further illustrate these monovalent groups, Y can be hydrocarbyl, e.g., alkyl, cycloalkyl, aryl, alkaryl, aralkyl, and the like; hydrocarbyloxymethyl, e.g., alkoxymethyl, cycloalkoxymethyl, aryloxymethyl, aralkoxymethyl, alkaryloxymethyl, and the like; acyloxymethyl, e.g., alkanoyloxymethyl, arylcarbonyloxymethyl, cycloalkanecarbonyloxymethyl, and the like; nitro (—NO$_2$); and the unit

each $R_1$ being hydrocarbyl, that is, a monovalent hydrocarbon radical such as alkyl, cycloalkyl, aryl, aralkyl, alkaryl, and the like; Y' can be hydrocarbyl, e.g., alkyl, cycloalkyl, aryl, alkaryl, aralkyl, and the like; hydrocarbyloxymethyl, e.g., alkoxymethyl, cycloalkoxymethyl, aryloxymethyl, aralkoxymethyl, alkaryloxymethyl, and the like; and acyloxymethyl, e.g., alkanoyloxymethyl, arylcarbonyloxymethyl, and the like; and wherein Y and Y' together with the gem carbon atom form a divalent carbocyclic or heterocyclic nuclei, e.g., (1)

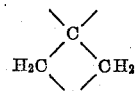

(2)

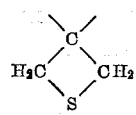

(3) 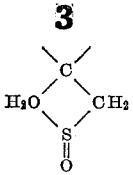

(4) 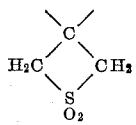

(5) 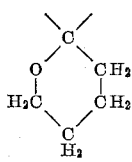

(6) 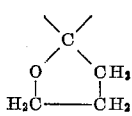

(7) 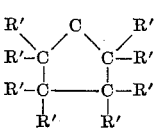

(8) 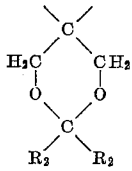

(9) 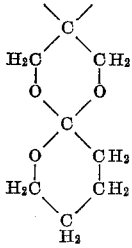

(10) 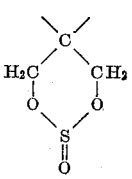

(11) 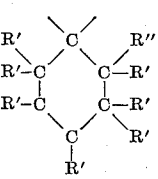

(12) 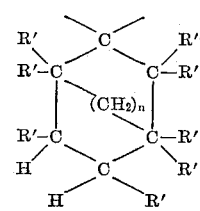

Each R' of the nuclei designated as (7), (11), and (12) as well as each $R_2$ of the nucleus designated as (8) supra can be hydrogen or a monovalent hydrocarbon radical which is free of ethylenic and acetylenic unsaturation, preferably hydrogen or lower alkyl such as methyl, ethyl, isopropyl, n-propyl, isobutyl, n-butyl, sec-butyl, t-butyl, and the like. The R'' radicals can be hydrogen; a monovalent hydrocarbon radical which is free of ethylenic and acetylenic unsaturation such as alkyl, aryl, cycloalkyl, alkaryl, aralkyl, etc., e.g., methyl, ethyl, n-propyl, isobutyl, 2-ethylhexyl, dodecyl, octadecyl, cyclopentyl, cyclohexyl, phenyl, tolyl, xylyl, phenethyl, benzyl, naphthyl, and the like; and furyl. It is preferred that R'' by hydrogen, lower alkyl, or phenyl. The variable $n$ of nucleus (12) is an integer having a value of 1 or 2.

With reference to Formula I above, illustrative Y' radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the cycloalkyls, especially those which contain from 5 to 7 carbon atoms in the cycloaliphatic nucleus, e.g., cyclopentyl, cyclohexyl, cycloheptyl, alkylcyclopentyl, alkylcyclohexyl, alkylcycloheptyl, and the like; the aryls, e.g., phenyl, naphthyl, anthryl, biphenylyl, and the like; the aralkyls, e.g., benzyl, phenethyl, phenylbutyl, and the like; the alkaryls, e.g., tolyl, xylyl, ethylphenyl, octylphenyl, and the like; the alkoxymethyls, preferably the lower alkoxymethyls, e.g., methoxymethyl, ethoxymethyl, propoxymethyl, n-butoxymethyl, t-butoxymethyl, isobutoxymethyl, 2-ethylhexoxymethyl, decoxymethyl, and the like; the cycloalkoxymethyls, especially those which contain from 5 to 7 carbon atoms in the cycloaliphatic nucleus, e.g., cyclopentoxymethyl, cyclohexoxymethyl, cycloheptoxymethyl, lower alkyl substituted cyclohexoxymethyl, and the like; phenoxymethyl; benzyloxymethyl; naphthyloxymethyl; toloxymethyl; xyloxymethyl; ethylphenoxymethyl; and the like; the acyloxymethyls, e.g., ethanoyloxymethyl, propanoyloxymethyl, butanoyloxymethyl, hexanoyloxymethyl, octanoyloxymethyl, benzoyloxymethyl, phenylethanoyloxymethyl, cyclohexanecarbonyloxymethyl, and the like.

With further reference to Formula I supra, illustrative Y radicals include (in addition to the aforementioned Y' radicals), the dialkylaminos, preferably the lower dialkylaminos, e.g., dimethylamino, diethylamino, diisopropylamino, di-n-butylamino, di-sec-butylamino, di-t-butylamino, diisobutylamino, di-2-ethylhexylamino, didodecylamino, dioctadecylamino, and the like; the dicycloalkylaminos, especially those which contain from 5 to 6 carbon atoms in the cycloaliphatic nucleus, e.g., dicyclopentylamino, dicyclohexylamino, di(lower alkyl-substituted cyclohexyl)amino, and the like. It is pointed out at this time that the terms a "lower alkyl" radical or a "lower alkoxy" radical, as used herein, includes those radicals which contain from 1 to 6 carbon atoms therein. It is further preferred that the Y and Y' radicals, individually, contain no more than 12 carbon atoms each.

Exemplary classes of cyclic carbonate compounds include 4-nitro-4-alkanoyloxymethyl-2,6-dioxacyclohexanone,
4-dialkylamino-4-alkanoyloxymethyl-2,6-dioxacyclohexanone,
4-nitro-4-cycloalkanecarbonyloxymethyl-2,6-dioxacyclohexanone,
4-nitro-4-alkoxymethyl-2,6-dioxacyclohexanone,
4-nitro-4-cycloalkoxymethyl-2,6-dioxacyclohexanone,
4-nitro-4-alkylbenzyloxymethyl-2,6-dioxacyclohexanone,
4-dialkylamino-4-alkoxymethyl-2,6-dioxacyclohexanone,
4-dialkylamino-4-cycloalkoxymethyl-2,6-dioxacyclohexanone,
4-nitro-4-alkyl-2,6-dioxacyclohexanone,
4-nitro-4-cycloalkyl-2,6-dioxacyclohexanone,
4-alkyl-4-cycloalkyl-2,6-dioxacyclohexanone,
4-alkyl-4-alkyloxymethyl-2,6-dioxacyclohexanone,
4-aryl-4-alkoxymethyl-2,6-dioxacyclohexanone,
4,4-dialkyl-2,6-dioxacyclohexanone, 4,4-di(alkoxymethyl)-2,6-dioxacyclohexanone,
4,4-di(alkanoyloxymethyl)-2,6-dioxacyclohexanone,
4,4-dicycloalkyl-2,6-dioxacyclohexanone, and the like.

Specific examples of the cyclic carbonate compounds include, for instance, 4-nitro-4-methoxymethyl-2,6-dioxacyclohexanone,
4-nitro-4-propoxymethyl-2,6-dioxacyclohexanone,
4-nitro-4-butoxymethyl-2,6-dioxacyclohexanone,
4-nitro-4-hexoxymethyl-2,6-dioxacyclohexanone,
4-nitro-4-methylbenzyloxymethyl-2,6-dioxacyclohexanone,
4-nitro-4-propylbenzyloxymethyl-2,6-dioxacyclohexanone,
4-diethylamino-4-methoxymethyl-2,6-dioxacyclohexanone,
4-diisopropylamino-4-ethoxymethyl-2,6-dioxacyclohexanone,
4-nitro-4-propyl-2,6-dioxacyclohexanone,
4-nitro-4-n-butyl-2,6-dioxacyclohexanone,
4-nitro-4-(2-ethylhexyl)-2,6-dioxacyclohexanone,
4-nitro-4-octyl-2,6-dioxacyclohexanone,
4-nitro-4-cyclohexyl-2,6-dioxacyclohexanone,
4-nitro-4-propanoyloxymethyl-2,6-dioxacyclohexanone,
4-nitro-4-butanoyloxymethyl-2,6-dioxacyclohexanone,
4-nitro-4-hexanoyloxymethyl-2,6-dioxacyclohexanone,
4-nitro-4-cyclohexanecarbonyloxymethyl-2,6-dioxacyclohexanone,
4-dimethylamino-4-propanoyloxymethyl-2,6-dioxacyclohexanone,
4-diethylamino-4-propanoyloxymethyl-2,6-dioxacyclohexanone,
4-methyl-4-ethyl-2,6-dioxacyclohexanone,
4,4-diethyl-2,6-dioxacyclohexanone,
4-isopropyl-4-ethyl-2,6-dioxacyclohexanone,
4-ethyl-4-cyclohexyl-2,6-dioxacyclohexanone,
4-methyl-4-ethoxymethyl-2,6-dioxacyclohexanone,
4-methyl-4-propoxymethyl-2,6-dioxacyclohexanone,
4-ethyl-4-propoxymethyl-2,6-dioxacyclohexanone,
4-ethyl-4-butoxymethyl-2,6-dioxacyclohexanone,
4-phenyl-4-propoxymethyl-2,6-dioxacyclohexanone,
4,4-dimethyl-2,6-dioxacyclohexanone,
4,4-di-n-butyl-2,6-dioxacyclohexanone,
4,4-di(propoxymethyl)-2,6-dioxacyclohexanone,
4,4-di(butoxymethyl)-2,6-dioxacyclohexanone,
4,4-di(propanoyloxymethyl)-2,6-dioxacyclohexanone,
and the like.

Further illustrative cyclic carbonates which are contemplated include, for instance, the mono-, di- and/or trihydrocarbyl substituted 2,6-dioxacyclohexanones such as 3- and/or 4- and/or 5- alkyl-2,6-dioxacyclohexanones, the 3- and/or 4- and/or 5- aryl-2,6-dioxacyclohexanones, the 3- and/or 4- and/or 5-cycloalkyl-2,6-dioxacyclohexanones, the 3- and/or 4- and/or 5- alkaryl-2,6-dioxacyclohexanones, the 3- and/or 4- and/or 5- aralkyl-2,6-dioxacyclohexanone, e.g., 3- and/or 4-methyl-2,6-dioxacyclohexanone, 3- and/or 4-ethyl-2,6-dioxacyclohexanone, 3- and/or 4-propyl-2,6-dioxacyclohexanone, 3- and/or 4-isopropyl-2,6-dioxacyclohexanone, 3- and/or 4-n-butyl-2,6-dioxacyclohexanone, 3- and/or 4-isobutyl-2,6-dioxacyclohexanone, 3- and/or 4-t-butyl-2,6-dioxacyclohexanone, 3- and/or 4-phenyl-2,6-dioxacyclohexanone, 3- and/or 4-tolyl-2,6-dioxacyclohexanone, 3- and/or 4-benzyl-2,6-dioxacyclohexanone, and the like; the 3,4,5-tri(lower alkyl)-2,6-dioxacyclohexanone, e.g., 3,4,5-trimethyl-2,6-dioxacyclohexanone, 3,4,5-triethyl-2,6-dioxacyclohexanone and the like; the polymethylene carbonates which have at least 6 atoms in the ring nucleus which contains the carbonate group, e.g., trimethylene carbonate, decamethylene carbonate, undecamethylene carbonate, dodecamethylene carbonate, tridecamethylene carbonate, octadecamethylene carbonate, and the like; the polyoxyalkylene carbonates, e.g., triethylene glycol carbonate, tetraethylene glycol carbonate, and the like; the 4,4-di(halomethyl)-2,6-dioxacyclohexanone such as the 4,4-di(chloromethyl)-2,6-dioxacyclohexanones, etc.; 4,4-di(cyanomethyl)-2,6-dioxacyclohexanone; 3-chloromethyl-2,6-dioxacyclohexanone; and 3-cyanomethyl-2,6-dioxacyclohexanone.

The preparation of 4-nitro-4-hydrocarbyloxymethyl-2,6-dioxacyclohexanone or 4-nitro-acyloxymethyl-2,6-dioxacyclohexanone, etc., is effected by the following sequence of steps:

(1) 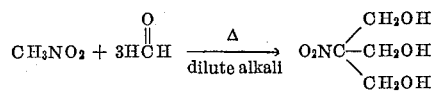

Equation 1 supra represents an aldol-like condensation reaction which can be conducted in the presence of a basic catalyst, e.g., a dilute alkali metal hydroxide solution, at a moderately elevated temperature. The product, i.e., tris(hydroxymethyl)-nitromethane, is then contacted with a hydrocarbyl halide or an acyl halide which is designated as R″X in Equation 2 below:

(2) 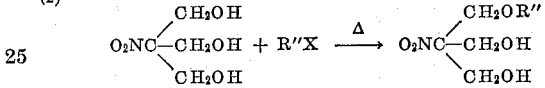

The resulting monoetherified product or monoesterified product, as may be the case, then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

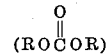

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_3$ and $Y_4TiO_4$ in which the Y's are alkyl aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3) 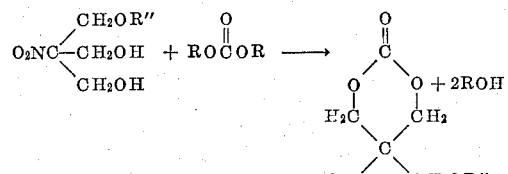

The R″ radical in Equation 3 above is hydrocarbyl or acyl.

The preparation of 4-tertiary amino-4-hydrocarbyloxymethyl-2,6-dioxacyclohexanone or 4-tertiary amino-4-acyloxymethyl-2,6-dioxacyclohexanone can be accomplished by contacting the monoetherified product or monoesterified product of Equation 2 supra with hydrogen, in the presence of conventional hydrogenation catalysts, e.g., Raney nickel, platinum, and the like, at an elevated temperature, followed by alkylation of the resulting primary amino group ($-NH_2$) with, for example, a stoichiometric quantity of a hydrocarbyl halide, preferably in the presence of a base, e.g., an alkali metal hydroxide, to thus convert said —NO₂ group to a tertiary amino group, i.e., (4) 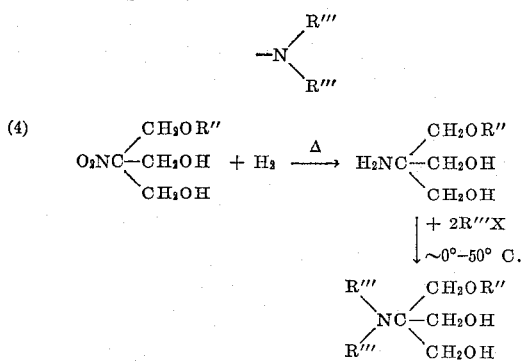

The resulting tertiary amino compounds are readily cyclized to the corresponding carbonates by following the procedure shown in Equation 3 supra.

The 4-nitro-4-hydrocarbyl-2,6-dioxacyclohexanones and 4-t-amino-4-hydrocarbyl-2,6-dioxacyclohexanones, can be prepared by the reaction of a hydrocarbyl substituted nitromethane, i.e., $RCH_2NO_2$ wherein R is an alkyl, aryl, cycloalkyl, aralkyl, alkaryl, etc., with an excess of formaldehyde, as shown in the following equation:

(5) 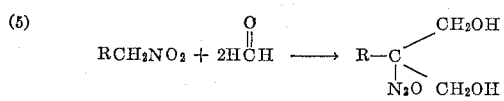

The resulting 2-nitro-2-hydrocarbyl-1,3-propanediol compound in Equation 5 then can be subjected to the cyclization step illustrated in Equation 3 supra, or it can undergo the sequence of steps illustrated in Equation 4, thus producing the corresponding various nitro and tertiary amino substituted carbonates.

The preparation of 4,4-di(hydrocarbyl)-2,6-dioxacyclohexanone is accomplished by an aldol condensation of the appropriate aldehyde which contains one alpha hydrogen atom, with formaldehyde, followed by a Cannizzaro reaction with additional formaldehyde. Equation 6 depicts the over-all reaction:

(6) 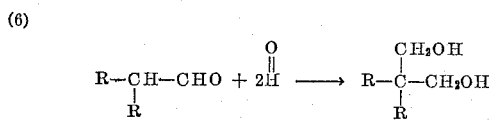

Both R's in Equation 6 represent hydrocarbyl groups. The resulting 2,2-di(hydrocarbyl)-1,3-propanediol then can be subjected to the cyclization step discussed in Equation 3 to yield 4,4-di(hydrocarbyl)-2,6-dioxacyclohexanone.

The preparation of 4-hydrocarbyl-4-hydrocarbyloxymethyl - 2,6 - dioxacyclohexanone or 4-hydrocarbyl-4-acyloxymethyl-2,6-dioxacyclohexanone is conveniently prepared by employing an aldehyde which contains two alpha hydrogen atoms in Equation 6 supra, that is:

(7) 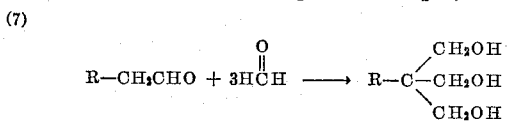

The resulting 1 - hydrocarbyl - 1,1,1 - trimethylolmethane then can be reacted with R″X of Equation 2 supra, followed by the cyclization step of Equation 3 to obtain the cyclic carbonate under consideration.

The 4,4 - di(hydrocarbylmethyl)-2,6-dioxacyclohexanones or 4,4-di(acyloxymethyl)-2,6-dioxacyclohexanones are prepared by the reaction of pentaerythritol with sufficient R″X (note Equation 2) to produce the diether or diester of pentaerythritol which, in turn, can be cyclized (note Equation 3) to yield the corresponding carbonates. Equation 8 below illustrates the over-all reactions.

(8) 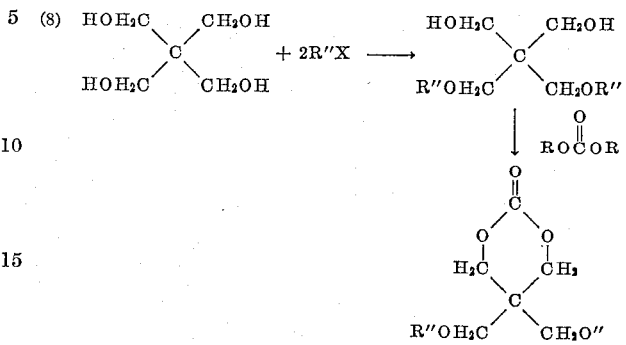

The Diels-Alder reaction of equimolar quantities of a butadiene compound and an acrolein compound results in a cyclohexenecarboxaldehyde as shown below:

(9) 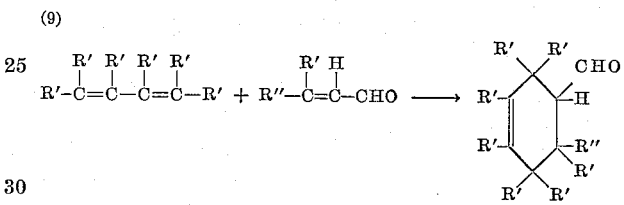

An aldol condensation of the resulting cyclohexenecarboxaldehyde product with formaldehyde, followed by a Cannizzaro reaction with additional formaldehyde, produces a 4,4-dimethylolcyclohexene product. Equation 10 below depicts the over-all reaction:

(10) 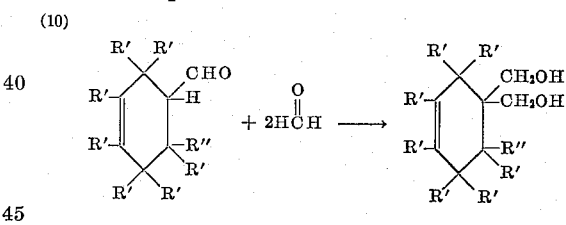

The resulting 4,4-dimethylolcyclohexene product then is hydrogenated in the presence of a conventional hydrogenation catalyst, e.g., platinum, and hydrogen, at an elevated temperature, e.g., 200° C., to produce a 4,4-dimethylolcyclohexene which in turn can be cyclized to a 3-oxo-2,4-dioxaspiro[5.5]undecane.

The Diels-Alder reaction of equimolar quantities of a conjugated cycloalkadienic compound (having 5 or 6 ring carbon atoms) and an acrolein compound yields a carboxaldehyde substituted bicycloalkene product which, in turn, can be reacted with formaldehyde (not Equation 10 supra) to give a gem dimethylol substituted bicycloalkene. Hydrogenation of this cycloolefin as illustrated above, followed by the cyclization of the dimethylol substitute bicycloalkane produces the carbonate of bicyclo[2.2.1]heptane - 2,2 - dimethanols or bicyclo [2.2.1]octane-2,2-dimethanols.

The preparation of 3 - oxo-2,4,8-trioxaspiro[5.3]nonane is effected as follows:

(11) 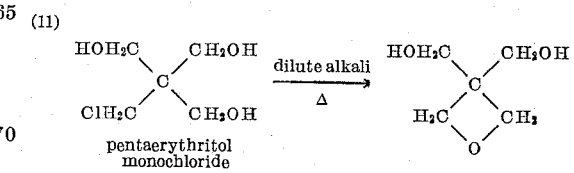

The resulting 3,3-dimethyloloxetane product then can be subjected to the cyclization step illustrated in Equation 3 supra to produce the subject carbonate.

The preparation of 3-oxo-8-thia-2,4-dioxaspiro[5.3]nonane is accomplished as follows:

(12)

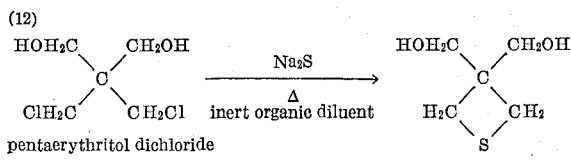

pentaerythritol dichloride

The resulting 3,3-dimethylolthietane product then can be subjected to the cyclization step to obtain the corresponding carbonate compound.

The reaction of a molar excess of 3,3-dimethylolthietane with peracetic acid (contained as a 25 weight per cent solution in ethyl acetate), at about 40° C., yields 1 - oxo - 3,3 - dimethylolthietane which in turn can be cyclized to 3 - oxo - 8-thia-2,4-dioxaspiro[5.3]nonane-8-oxide. By employing a stoichiometric excess of peracetic acid, e.g., greater than two mols per mol of 3,3-dimethylolthietane, there is obtained 1,1 - dioxo - 3,3-dimethylolthietane which in turn can be cyclized to 3-oxo-8-thia-2,4-dioxaspiro[5.3]nonane-8-dioxide.

The 3 - oxo-2,4,8,10-tetraoxaspiro[5.5]undecanes are prepared by reacting a monocarbonyl compound, which is free of ethylenic and acetylenic unsaturation, e.g., formaldehyde, alkanal, cycloalkanecarboxaldehyde, the aromatic carboxaldehydes, dialkyl ketone, diaryl ketone, alkyl aryl ketone, etc.; with pentaerythritol; in the presence of a mineral acid or sulfonic acid catalyst, e.g., sulfuric acid, ethanesulfonic acid, benzenesulfonic acid, and the like; at an elevated temperature ,e.g. from about 50° C. to about 150° C.; followed by cyclizing the resulting 5,5-dimethylol-1,3-dioxacyclohexane product to produce the subject carbonates. If the monocarbonyl compound is acrolein, and the resulting product is hydrogenated, as illustrated previously, prior to the cyclization step, there is obtained 3-oxo-2,4,8,10-tetraoxaspiro[5.5]undecane-9-(2'-tetrahydropyran).

The reaction of pentaerythritol with sulfonyl chloride at a moderately elevated temperature, e.g., about 50° C. to about 75° C., yields 2-oxo-5,5-dimethylol-1,3-dioxa-2-thiacyclohexane which in turn can be cyclized to 3-oxo-2,4,8,10-tetraoxa-9-thiaspiro[5.5]undecane-9-oxide.

The 4 - substituted - 4-cyanoalkoxymethyl-2,6-dioxacyclohexanones wherein the 4-substituted moiety is hydrocarbyl, nitro, or tertiary amino such as those illustrated previously can be prepared by reacting a molar excess of 1-hydrocarbyl-1,1,1-trimethylolmethane or 1-nitro-1,1,1-trimethylolmethane with an alpha, beta-unsaturated nitrile such as the 2-alkenenitriles, e.g., acrylonitrile, and then cyclizing the 2-substituted-2-cyanoalkoxymethyl-1,3-propanediol to the corresponding carbonate. The nitro group (—NO₂) of the 2-nitro-2-cyanoalkoxymethyl-1,3-propanediols can be hydrogenated to the amino group (—NH₂), followed by alkylating the —NH₂ group to the tertiary amino group (—NR₂), and then cyclizing the 2-tertiary amino-2-cyanoalkoxymethyl-1,3-propanediols to. the 4-tertiary amino-4-cyanoalkoxymethyl-2,6-dioxacyclohexanones. The 4,4-di(cyanoalkoxymethyl)-2,6-dioxacyclohexanones prepared by reacting one mol of pentaerythritol with two moles of 2-alkenenitrile, e.g., acrylonitrile, to yield 2,2-di(cyanoalkoxymethyl)-1,3-propanediol, followed by cyclizing to produce the subject carbonate.

The preparation of 3-oxo-2,4,7-trioxaspiro[5.5]undecane is accomplished by employing the acrolein dimer in lieu of the cyclohexenecarboxaldehyde reactant of Equation 10 supra. Hydrogenation of the 4,4-dimethylol-3-oxacyclohexene product, followed by cyclization, yields the cyclic carbonate.

The substitution of tetrahydrofurfural in lieu of the acrolein dimer, followed by the cyclization of the 2,2-dimethyloloxacyclopentane product yields 3 - oxo-2,4,7-trioxaspiro[5.4]decane. The use of a cyclopentanecarboxaldehyde in place of tetrafurfural results in 3-oxo-2,4-dioxaspiro[5.4]decanes.

The various 3- and/or 4- and/or 5-hydrocarbyl-2,6-dioxacyclohexanones can be prepared by cyclizing the appropriate mono-, di-, or trisubstituted 1,3-propanediol to produce the corresponding cyclic carbonate.

The 4,4-di(halomethyl)-2,6-dioxacyclohexanones such as 4,4-di(chloromethyl)-2,6-dioxacyclohexanone can be prepared by cyclizing pentaerythritol dichloride with dialkyl carbonate; 4,4-di(cyanomethyl) - 2,6-dioxacyclohexanone can be prepared by reacting one mol of pentaerythritol dichloride with two mols of an alkali metal cyanide to thus yield the 2,2-di(cyanomethyl)-1,3-propanediol which, in turn, can be cyclized to give the subject carbonate; 3-chloromethyl-2,6-dioxacyclohexanone and 3-cyanomethyl-2,6-dioxacyclohexanone prepared by cyclizing 4-chloro-1,3 - butanediol and 4-cyano-1,3-butanediol, respectively.

The catalysts which are contemplated in the novel processes to prepare the polymeric products are characterized in detail herein below.

One class of catalysts is represented by the following formula:

(II) 

wherein M represents a Group II metal in the Periodic Table,[1] for example, beryllium, magnesium, calcium, strontium, barium, zinc, or cadmium; wherein $R_a$ represents a monovalent hydrocarbon radical, a pyridyl radical, or a furyl radical; and wherein $R_b$ represents hydrogen, halo, a monovalent hydrocarbon radical, a secondary amino radical, a hydrocarbyloxy radical, a pyridyl radical, or a furyl radical, and the like.

With reference to Formula II, the monovalent hydrocarbon radicals include aliphatic, aromatic, and alicyclic radicals as exemplified by alkyl, cycloalkyl, aryl, alkaryl, aralkyl, and the like. More specifically, illustrative hydrocarbon radicals include, for instance, methyl, ethyl, isopropyl, n-propyl, n-butyl, t-butyl, isobutyl, sec-butyl, aryl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclopentyl, 2-butylcyclohexyl, 3-methylcycloheptyl, phenyl, benzyl, ortho-, meta-, and para-tolyl, the xylyls, butylphenyl, phenethyl, phenylpropyl, phenylbutyl, and the like. Exemplary pyridyl radicals include, for example, 2-, 3-, and 4-pyridyl, alkyl-2-pyridyl, 3-methyl-2-pyridyl, 5-ethyl-2-pyridyl, 6-n-butyl-2-pyridyl, and the like. Illustrative furyl radicals include, for instance, 2- and 3-furyl, alkyl-2-furyl, 3-methyl-2-furyl, 3-propyl-2-furyl, and the like. Illustrative secondary amino radicals encompass, for instance, dimethylamino, diethylamino, di-n-propylamino, N-ethylpropylamino, di-2-ethylhexylamino, N-ethyl-m-toluidino, N-propyl-2,3-xylidino, N-methyl-anilino, N-isopropyl-benzylamino, N-phenyl-benzylamino, N-methyl-α-naphthalamino, N-cyclohexyl-heptylamino, 1-piperidyl, 1-pyrrolidyl, 1-pyrryl, and the like. Among the hydrocarbyloxy radicals can be listed, for instance, alkoxy, aryloxy, alkenylcycloalkyloxy, cycloalkenyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-toloxy, 2-propylphenoxy, butylphenoxy, n-undecylphenoxy, 2-phenethoxy, benzyloxy, allyloxy, 2-butenyloxy, 2-pentenyloxy, cyclopentyloxy, cyclohexyloxy, cycloheptyloxy, alkylcyclohexyloxy, cyclopentenyloxy, cyclohexenyloxy, cycloheptenyloxy, and the like. The halo radicals include chloro, bromo, and iodo.

Illustrative subclasses of organometallic catalysts which are encompassed within Formula II supra include, for

---

[1] The Periodic Table referred to in this specification including the appended claims is the "Periodic Chart of the Atoms" contained in the text entitled "Key to Periodic Chart of the Atoms," by W. F. Meggers, 1956 edition, published by W. M. Welch Scientific Company, Chicago, Ill.

example, dialkylzinc, alkylzinc halide, alkylzinc alkoxide, dialkylberyllium, alkylberyllium halide, dialkylmagnesium, alkylmagnesium halide, alkylmagnesium alkoxide, dialkylcadmium, diarylzinc, alkylzinc dialkylamide, alkylmagnesium dialkylamide, and the like. Specific examples, include among others, diethylzinc, di-n-propylzinc, diisopropylzinc, di-n-butylzinc, di-t-butylzinc, diisobutylzinc, di-2-ethylhexylzinc, diphenylzinc, n-butylzinc butoxide, octylzinc chloride, phenylzinc bromide, dimethylmagnesium, dipropylmagnesium, propylphenylmagnesium, n-butylmagnesium chloride, diphenylmagnesium, phenylmagnesium chloride, dimethylberyllium, diethylberyllium, dipropylberyllium, di-n-butylberyllium, propylberyllium chloride, dimethylcadmium, diethylcadmium, dipropylcadmium, diisobutylcadmium, diisoamylcadmium, phenylcadmium iodide, butylzinc diethylamide, ethylzinc dipropylamide, phenylmagnesium diethylamide, 2-pyridylmagnesium chloride, 3-furylmagnesium iodide, 2-butenylzinc ethoxide, butylzinc allyloxide, and the like.

A second class of organometallic compounds which are contemplated as catalysts can be characterized by the following formula:

(III)          R'—M—R''$_x$ wherein M is a Group III–B metal in the Periodic Table, e.g., aluminum, indium, and gallium; wherein $x$ is an integer having a value of 2; wherein R' is a monovalent hydrocarbon radical free of ethylenic and acetylenic unsaturation, e.g., alkyl, aryl, cycloalkyl, aralkyl, alkaryl, and the like; and wherein each R'', individually, is hydrogen; a halo radical, e.g., chloro, fluoro, bromo, or iodo; a hydrocarbyloxy radical, e.g., alkoxy, aryloxy, and the like; or a monovalent hydrocarbon radical free of ethylenic and acetylenic unsaturation, e.g., alkyl, aryl, cycloalkyl, aralkyl, alkaryl, and the like. Illustrative monovalent hydrocarbon radicals include, for example, methyl, ethyl, propyl, isobutyl, sec-butyl, t-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclohexyl, 2-butylcyclohexyl, 2-methylcycloheptyl, phenyl, benzyl, ortho-, meta-, and para-tolyl, the xylyls, butylphenyl, phenethyl, phenylpropyl, phenylbutyl, trimethylphenyl, and the like. Exemplary hydrocarbyloxy radicals include, for instance, methoxy, ethoxy, propoxy, isopropoxy, sec-butoxy, n-butoxy, t-butoxy, hexoxy, 2-ethylhexoxy, octoxy, dodecoxy, octadecoxy, phenoxy, phenethoxy, benzyloxy, ortho-, meta-, and para-toloxy, phenylpropoxy, phenylbutoxy, and the like. It is preferred that the R' and R'' variables contain less than 12 carbon atoms.

Illustrative subclasses of organometallic catalysts encompassed within the scope of Formula III supra include, for example, trialkylaluminum, alkylaluminum dihalide, dialkylaluminum alkoxide, dialkylaluminum halide, trialkylindium, diarylindium halide, trialkylgallium, and the like. Specific examples of the organometallic catalysts include trimethylaluminum, triethylaluminum, tri-n-propylaluminum, triisopropylaluminum, tri-n-butylaluminum, tri-t-butylaluminum, triisobutylaluminum, trioctadecylaluminum, dipropylaluminum chloride, diisopropylaluminum bromide, triethylgallium, trimethylindium, and the like.

A third class of compounds which are contemplated as catalysts can be characterized by the following formula:

(IV)          M(R)$_y$ wherein $y$ is an integer having a value of three; wherein M represents a Group III–B metal in the Periodic Table, for example, aluminum, indium, or gallium; wherein each R represents a hydrocarbyloxy radical, e.g., alkoxy, cycloalkoxy, aryloxy, aralkoxy, alkaryloxy, and the like. Illustrative hydrocarbyloxy radicals include methoxy, ethoxy, n-propoxy, isopropoxy, n-butoxy, t-butoxy, sec-butoxy, isobutoxy, pentoxy, hexoxy, isohexoxy, 2-ethylhexoxy, n-octoxy, decoxy, dodecoxy, octadecoxy, cyclohexoxy, phenoxy, methylphenoxy, phenethoxy, and the like. It is preferred that R represents an alkoxy group which contains up to 10 carbon atoms, particularly 2 to 4 carbon atoms.

Another class of compounds which are contemplated as catalysts can be characterized by the following formula:

(V)          MR' wherein M represents a Group I–A metal in the Periodic Table, i.e., an alkali metal, for example, lithium, sodium, potassium, rubidium, or cesium; and wherein R' represents a monovalent hydrocarbon radical, a pyridyl radical, a furyl radical, or

wherein each R, individually, is hydrogen or a hydrocarbyl radical, and both R variables together with N can represent a heterocyclic ring which contains from 5 to 6 atoms in said ring and up to 3 hetero atoms of the group of nitrogen, sulfur, and oxygen.

The monovalent hydrocarbon radicals include aliphatic, aromatic, and alicyclic radicals as exemplified by alkyl, alkenyl, cycloalkyl, cycloalkenyl, aryl, alkaryl, aralkyl and the like. More specifically, illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclopentyl, 2-butylcyclohexyl, 3-methylcycloheptyl, propenyl, allyl, 3-butenyl, the cyclopentenyls, the cyclohexenyls, the cycloheptenyls, the alkylcyclohexenyls, phenyl, benzyl, ortho-, meta-, and para-tolyl, the xylyls, butylphenyl, phenethyl, phenylpropyl, phenylbutyl, ethynyl, 1-butynyl, 2-butynyl, cinnamyl, naphthyl, trimethylphenyl, 9-fluorenyl, and the like. Exemplary pyridyl radicals include, for example, 2-, 3-, and 4-pyridyl, alkyl-2-pyridyl, 3-methyl-2-pyridyl, 5-ethyl-2-pyridyl, 6-n-butyl-2-pyridyl, and the like. Illustrative furyl radicals include, for instance, 2- and 3-furyl, alkyl-2-furyl, 3-methyl-2-furyl, 3-propyl-2-furyl, and the like.

Illustrative subclasses of catalysts encompassed within Formula V supra include, for example, alkylsodium, alkyllithium, alkylpotassium, alkylrubidium, alkylcesium, arylsodium, aryllithium, arylpotassium, cycloalkylsodium, cycloalkylpotassium, the alkali metal naphthalenes, the alkali metal pyridyls, the alkyl metal furyls, and the like. The alkylmetals and arylmetals are preferred. Specific examples of the organometallic catalysts include, among others, methylsodium, ethylsodium, n-propylsodium, n-butylsodium, 2-ethylhexylsodium, n-octyllithium, dodecyllithium, ethylpotassium, isopropylpotassium, n-butylpotassium, n-dodecylpotassium, phenyllithium, phenylsodium, phenylpotassium, 3-tolylsodium, 3-para-xylyllithium, 2-n-propylphenylsodium, cyclopentylsodium, cyclohexylpotassium, 3-n-butylcyclohexyllithium, cycloheptylpotassium, 4-n-octylcyclohexylsodium, phenethylsodium, benzyllithium, phenylpropylpotassium, 9-fluorenylpotassium, sodium naphthalene, potassium naphthalene, lithium naphthalene, vinylsodium, propenyllithium, 3-butenyllithium, 2-butenylpotassium, allylsodium, 2-pyridylsodium, 2-pyridylpotassium, 2-pyridyllithium, alkyl-2-pyridylsodium, alkyl-2-pyridyllithium, alkyl-2-pyridylpotassium, 3-n-propylpyridylsodium, 3-ethylpyridylpotassium, 2-furylsodium, 3-furylpotassium, 2-furyllithium, alkyl-2-furyllithium, alkyl-2-furylsodium, alkyl-2-furylpotassium, 3-methyl-2-furylpotassium, 3-n-butyl-2-furyllithium, 4-ethyl-2-furylsodium, N-pyrrolidyllithium, N-pyrrylsodium, and the like.

In addition, various amide-containing compounds are contemplated as catalysts in the novel processes of the invention, namely, (a) the divalent metal amides, i.e., H$_2$N—M—NH$_2$, (b) the divalent metal amide-alcoholates, and (c) mixtures of divalent metal amides and divalent metal amide-alcoholates, the metal portion (M) of which has an atomic number greater than 11 and less than 57 and is found in Group II of the Periodic Table. These divalent metals include magnesium, zinc, calcium, strontium, cadmium, and barium. The amides of magnesium and alkaline earth metals, i.e., strontium, barium, and calcium, are preferred.

The divalent metal amide-alcoholates are characterized by the following formula:

(VI)   $H_2N—M—OR_1$ wherein M is a divalent metal which has an atomic number greater than 11 and less than 57 from Group II of the Periodic Table, i.e., magnesium, calcium, zinc, strontium, cadmium, and barium; and wherein $R_1$ is a monovalent hydrocarbon radical, e.g., alkyl, cycloalkyl, aryl, alkaryl, aralkyl, alkenyl, cycloalkenyl, and the like. Representative $R_1$ radicals include, among others, methyl, ethyl, propyl, isopropyl, butyl, isobutyl, t-butyl, 2-ethylhexyl, 2,4,4-trimethylpentyl, decyl, dodecyl, octadecyl, cyclopentyl, cyclohexyl, 2-methylcyclopentyl, 3-amylcyclohexyl, cycloheptyl, phenyl, benzyl, tolyl, xylyl, ethylphenyl, hexylphenyl, octylphenyl, phenethyl, phenylpropyl, phenylbutyl, allyl, 3-butenyl, 3-pentenyl, cyclopentenyl, cyclohexenyl, cycloheptenyl, and the like. In a preferred aspect, the $R_1$ variable is an alkyl radical which contains from 1 to 10 carbon atoms. In a further preferred aspect, $R_1$ is a lower alkyl, e.g., methyl, ethyl, n-propyl, butyl, and the like. It is further preferred that the divalent metal (M) be an alkaline earth metal, i.e., calcium, strontium, or barium. Of the alkaline earth metals calcium is highly preferred.

The divalent metal amide as well as the divalent metal amide-alcoholate can be prepared by various routes. These routes are set forth in detail in U.S. Patent No. 3,021,311.

Another class of catalysts which are employed in the novel processes of the invention are prepared by the mutual reaction and/or interaction of an alkaline earth metal hexammoniate, i.e., calcium, barium, or strontium hexammoniate, an olefin axide, and an organic nitrile. The reaction is carried out in a liquid ammonia medium. In principle, the reaction temperature can range from above about the freezing point of ammonia, i.e., about —78° C., to the critical temperature of ammonia, i.e., about +133° C. The preservation of a liquid ammonia phase obviously requires pressurized equipment at reaction temperatures above the atmospheric boiling point of ammonia, i.e., about —33° C. A reaction temperature in the range of from above about the freezing point of the liquid ammonia medium to about 25° C. is preferred. In a more preferred aspect the upper temperature limitation is about 10° C.

The ratio of the three components, i.e., alkaline earth metal hexammoniate, olefin oxide, and organic nitrile, can be varied over a wide range in the preparation of the catalysts. The reaction is conducted, as indicated previously, in an excess liquid ammonia medium. Thus, very active catalysts can be prepared by employing from about 0.3 to 1.0 mol of olefin oxide per mol of metal hexammoniate, and from about 0.2 to 0.9 mol of organic nitrile per mol of metal hexammoniate. Extremely active catalyst can be prepared by employing from about 0.4 to 1.0 mol of olefin oxide per mol of metal hexammoniate, and from about 0.3 to 0.8 mol of organic nitrile per mol of metal hexammoniate. It should be noted that the alkaline earth metal hexammoniate, $M(NH_3)_6$, wherein M can be calcium, barium, or strontium, contains alkaline earth metal in the zero valence state. Thus, the concentration or mol ratio of the olefin oxide and the organic nitrile is more conveniently based upon alkaline earth metal per se rather than alkaline earth metal hexammoniate.

The olefin oxides contemplated as reagent in the preparation of the catalysts are those containing solely carbon, hydrogen, and oxirane oxygen which is bonded to vicinal or adjacent carbon atoms to form an epoxy group, i.e.,

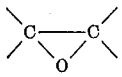

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]hexane, 3-methyl-6-oxabicyclo[3.1.0]hexane, 4-ethyl-6-oxabicyclo[3.1.0]hexane, and the like. Lower olefin oxides are preferred, that is ethylene oxide, propylene oxide, 1,2-epoxybutane, 2,3-epoxybutane, and the like.

The organic nitriles which are employed in the catalyst preparation, are preferably, the saturated aliphatic nitriles. Among the organic nitriles which are contemplated, include, for example, acetonitrile, propionitrile, butyronitrile, valeronitrile, isovaleronitrile, capronitrile, caprylonitrile, caprinitrile, and the like. Lower saturated aliphatic organic nitriles are preferred, that is acetonitrile, propionitrile, butyronitrile, and the like. Acetonitrile is most preferred.

In the preparation of the aforesaid catalysts, it appears that the olefin oxide reagent becomes bonded to the alkaline earth metal through the oxygen atom, i.e.,

R—O—M— wherein R would be ethyl when the olefin oxide is ethylene oxide, and M is the alkaline earth metal. However, analyses indicate that very little, if any, of the organic nitrile reagent is contained in the final product. Moreover, tests indicated the presence of alkylideneimine, e.g., ethylidene, which is probably formed by the reduction of organic nitrile, e.g., acetonitrile, by the metal, e.g., calcium, in liquid ammonia.

The preparation of the aforesaid catalysts can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and organic nitrile reagents, preferably as a mixture. If desired, the olefin oxide and organic nitrile reagents can be added separately. However, it is preferred that the separate addition of said reagents to the ammonia solution be conducted simultaneously. During the catalyst preparation agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried in an inert, normally-liquid organic vehicle such as, for example, lower dialkyl ether of alkylene glycol, e.g., the dimethyl-, diethyl-, or dipropyl ethers of diethylene glycol; dioxane; decahydronaphthalene; saturated aliphatic and cycloaliphatic hydrocarbons, e.g., hexane, heptane, cyclohexane, or 2-methylcycloheptane; and the like.

In practice, it has been found extremely desirable to employ a promoter and/or co-catalyst and/or chelating agent with the hydrocarbyl Group II metals and Group III-B metals encompassed within the scope of Formulas II and III supra. Suitable promoters and/or co-catalysts and/or chelating agents are, for example, alkanols, phenols, ketones, water, molecular oxygen, the polyols (aliphatic and aromatic), the diketones such as the acylacetones, the ketoesters, the ketoacids, the ketoaldehydes, the oximes such as ketoxime, other active hydrogen compounds, and mixtures thereof. The promoters and/or co-catalyst and/or chelating agents are extremely effective with dialkylzinc, e.g., dibutylzinc, diethylzinc, etc., and trialkylaluminum, e.g., triisobutylaluminum. The hydrocarbyl Group II metal and Group III–B metal compounds can be admixed or reacted with the aforesaid promoters and/or co-catalysts and/or chelating agents prior to effecting the polymerization reaction, or each can be admixed or reacted in situ.

Illustrative alkanols include methanol, ethanol, n-propanol, isopropanol, n-butanol, n-hexanol, lauryl alcohol, cetyl alcohol, stearyl alcohol, and the like. Particularly desirable alkanols are those which contain up to 10 carbon atoms.

Illustrative phenols include, by way of examples, the monohydric phenols, e.g., phenol, ortho-, meta-, and para-cresol, ortho-, meta-, and para-chlorophenol, the naphthols, and the like; the polyhydric phenols such as catechol, hydroquinone, resorcinol, pyrogallol, and the like, the di- and polynuclear phenols such as the bisphenols described in U.S. Patent No. 2,506,486 and the polyphenylols which result from the condensation of a phenol and an aldehyde or ketone (cf. Phenoplasts by T. S. Carswell, published 1947 by Interscience Publishers, New York).

Other illustrative active hydrogen compounds include, for instance, methyl ketone, ethyl ketone, propyl ketone, methyl ethyl ketone, acetonylacetone, acetylacetone, 3-methyl-2,4-pentanedione, ethyl acetoacetate, formylacetone, hydroxyacetone, salicylaldehyde, 2-hydroxyethyl acetate, diethyl malonate, malonaldehyde, glyoxal monoxime, dimethyl glyoxime, 2-nitroacetic acid, and the like. It is desirable to employ up to about one mol of active hydrogen compound per mol of the organometallic compound.

Of the foregoing, water is an extremely desirable promoter for the hydrocarbyl Group II metals, e.g., the alkylzincs such as diethylzinc, diisopropylzinc, di-n-propylzinc, di-n-butylzinc, diisobutylzinc, di-t-butylzinc, di-sec-butylzinc, n-butylzinc butoxide, etc., as well as the mono-, di-, and trihydrocarbyl Group III metals such as mono-, di-, and trialkylaluminums, e.g., triethylaluminum, triisopropylaluminum, tri-n-propylaluminum, tri-n-butylaluminum, tri-sec-butylaluminum, triisobutylaluminum, tri-t-butylaluminum, the corresponding dialkylaluminum hydrides and monoalkylaluminum dihydrides such as diisobutylaluminum hydride, isobutylaluminum dihydride, and others. The amount of water can vary over a wide range, e.g., from about 0.01 to about 1.3 mols, and higher, per mol of the hydrocarbyl Group II metals, and from about 0.01 to about 1.3 mols, and higher, per mol of the hydrocarbyl Group III metals. It is preferred that up to about equimolar quantities of water to hydrocarbyl Group II metals or hydrocarbyl Group III metals be employed. As indicated previously, the organometallic compound can be premixed and/or prereacted with the active hydrogen compound, e.g., water, and the resulting mixture then can be employed as the catalytic medium. Alternatively, the organometallic compound as well as the active hydrogen compound can be admixed or reacted in situ. Though the addition or inclusion of water to the organometallic compound has been termed a promoter, etc., in reality, however, a reaction occurs. Thus, for example, equimolar quantities of water and trihydrocarbylaluminum, such as triisobutylaluminum, results in poly(isobutylaluminum oxide) which has the recurring unit

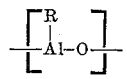

wherein R is hydrocarbyl such as isobutyl.

In addition to the aforesaid catalytic formulations, a system composed of an aluminum trialkoxide, e.g., aluminum triisopropoxide, and a zinc halide, such as zinc chloride, zinc bromide, etc., is also desirable in effecting the polymerization reaction. The amount of zinc halide can vary over a wide range, e.g., from about 0.01 to about 1.0, and higher, mol per mol of aluminum trialkoxide. Approximately, equimolar quantities of zinc halide and aluminum trialkoxide are preferred.

In a particularly preferred embodiment, the invention is directed to the polymerization of an admixture containing at least one cyclic carbonate monomer as illustrated previously and at least one cyclic ester described hereinafter, in the presence of the aforesaid catalysts, to thus give novel and useful polymeric products. By virtue of the inclusion of cyclic ester(s) in the polymerization medium, there can be obtained novel polymeric products which are "tailor-made" to fit a wide variety of uses. For example, the polymerization of a major mol percent of epsilon-caprolactone with a minor mol percent of 4,4-dimethyl-2,6-dioxacyclohexanone (using n-butyllithium as the catalyst) results in extremely high molecular weight copolymers which have outstanding plasticizing properties for vinyl halide resins such as polyvinyl chloride, vinyl chloride/vinyl acetate copolymers, etc. The polymerization of epsilon-caprolactone alone results in high molecular weight homopolymers which exhibit an inordinate quantity of crystallinity. This characteristic places realistic limits re their commercial acceptance as plasticizers. On the other hand, the polymerization of, for example, 4,4-dimethyl-2,6-dioxacyclohexanone alone results in homopolymers that do not exhibit the combination of properties of low volatility, high resistance to oil and water extraction, and high flexibility at extremely low temperatures when used as plasticizing agents for polyvinyl chloride. A 65–85 lactone/35–15 carbonate copolymer illustrated above, as a plasticizer for polyvinyl chloride, results in a plasticized composition which admirably exhibits the aforesaid combination of properties, i.e., low volatility, resistance to extraction, low brittle temperature, and good flexibility. Moreover, for instance, high molecular weight poly(4,4-dimethyl-2,6-dioxacyclohexanone) exhibits a relatively low melting point which precludes its use in most commercial fiber-forming applications. On the other hand, for example, a 75/25 copolymer of epsilon-caprolactone and 4,4-dimethyl-2,6-dioxacyclohexanone (reduced viscosity, for example, of at least 4.8), exhibits a relatively high melting point which is in the fiber-forming range for various applications. Such a high molecular weight copolymers as illustrated above, can be "drawn" into fibers via techniques well recognized in the art.

In brief, the novel copolymers which result from this particularly preferred embodiment are oftentimes "upgraded" and "tailor-made" by chemically combining the cyclic ester(s) therein.

The monomeric cyclic esters which are contemplated are best illustrated by the following formula:

(VII) 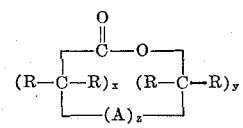

wherein each R, individually, can be hydrogen, alkyl, aryl, alkaryl, aralkyl, cycloalkyl, halo, haloalkyl, alkoxyalkyl, alkoxy, aroxy, and the like; wherein A can be an oxy (—O—) group, a thio (—S—) group, a divalent saturated aliphatic hydrocarbon group, and the like; wherein $x$ is an integer from 1 to 15, inclusive; wherein $y$ is an integer from 1 to 15, inclusive; wherein $z$ is an integer having a value of zero or one; with the provisos that (a) the sum of $x+y+z$ cannot equal 3, (b) the total number of atoms forming the cyclic ester ring does not exceed 18, preferably does not exceed 9, (c) the total number of organic substituents (such as those described for the R variables) attached to the carbon atoms contained in the cyclic ester ring does not exceed 4, preferably does not exceed 3, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variables attached to any two adjacent carbon atoms contained in the cyclic ester ring can represent a portion of a fused aromatic hydrocarbon nucleus.

With reference to Formula VII supra, illustrative R radicals include, among others, methyl, ethyl, n-propyl, isopropyl, n-butyl, sec-butyl, t-butyl, amyl, the hexyls, the heptyls, the octyls, dodecyl, octadecyl, phenyl, benzyl, tolyl, xylyl, ethylphenyl, phenethyl, phenylpropyl, phenylbutyl, cyclopentyl, 2-propylcyclohexyl, cyclohexyl, 2-methylcyclohexyl, cycloheptyl, chloromethyl, chloroethyl, bromopropyl, bromobutyl, chloro, fluoro, bromo, iodo, methoxymethyl, ethoxyethyl, propoxymethyl, butoxypropyl, methoxy, ethoxy, n-butoxy, isopentoxy, n-hexoxy, 2-ethylhexoxy, 3-methyloctoxy, decoxy, dodecoxy, octadecoxy, phenoxy, ethylphenoxy, propylphenoxy, dimethylphenoxy, phenylpropoxy, and the like. It is preferred that each R, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

Representative monomeric cyclic esters which can be employed in this preferred embodiment include, for example, beta-propiolactone, delta-valerolactone, epsilon-caprolactone, 7-hydroxyheptanoic acid lactone, 8-hydroxyoctanoic acid lactone, 12-hydroxydodecanoic acid lactone, 13-hydroxytridecanoic acid lactone, 14-hydroxytetradecanoic acid lactone, 15-hydroxypentadecanoic acid lactone, 16-hydroxyhexadecanoic acid lactone, 17-hydroxyheptadecanoic acid lactone; the alpha,alpha-dialkyl-beta-propiolactones, e.g., alpha,alpha-dimethyl-beta-propiolactone, alpha,alpha-diethyl - beta - propiolactone, alpha,alpha-dipropyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-dialkyl-, or trialkyl-epsilon-caprolactones, e.g., the monomethyl-, monoethyl-, monoisopropyl-, monohexyl-, mono-n-octyl-, dimethyl-, diethyl-, di-n-propyl-, diisobutyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, dimethoxy-, diethoxy-, and dibutoxy-delta-valerolactones and epsilon-caprolactones, and the like. Further illustrative cyclic esters include 3-ethyl-2-keto - 1,4 - dioxane, gamma(1-isopropyl-4-methylcyclohexyl) - epsilon-caprolactone, 3-bromo-2,3,4,5-tetrahydrobenzoxepin-2-one, 2-(2'-hydroxyphenyl)-benzene carboxylic acid lactone, 10-hydroxyundecanoic acid lactone, 2,5,6,7-tetrahydrobenzoxepin - 2 - one, 9-oxabicyclo[5.2.2]-undecan-8-one, 4-oxa-14-hydroxytetradecanoic acid lactone, alpha,alpha-bis(chloromethyl)-propiolactone, 1,4-dioxane-2-one, 3-n-propyl-2-ketone - 1,4 - dioxane, 3-(2-ethylhexyl)-2-keto-1,4-dioxane, and the like. Illustrative subclasses of cyclic esters which are eminently suitable in this preferred embodiment include, for example, the unsubstituted lactones and the oxalactones which contain four and from six to eight atoms in the lactone ring, preferably delta-valerolactone, epsilon-caprolactone, the ketodioxanes, and the like; the mono- and polyalkyl-substituted lactones and oxalactones which contain four and from six to eight atoms in the lactone ring, preferably the di(alpha-lower alkyl)-beta-propiolactones and the mono- and poly-lower alkyl-delta-valerolactones, epsilon-caprolactones, and their corresponding oxalactones wherein the alkyl substituent(s) contains from 1 to 6 carbon atoms, and the like; and the mono- and polyalkoxy-substituted lactones and oxalactones which contain four and from six to eight atoms in the lactone ring, preferably the mono- and poly-lower alkoxy-delta-valerolactones, epsilon-caprolactones, and their corresponding oxalactones wherein the alkoxy substituent(s) contains from 1 to 6 carbon atoms.

The catalysts are employed in catalytically significant quantities. For optimum results, the particular catalyst employed, the nature of the monomeric reactant(s), the operative conditions under which the polymerization reaction is conducted, and other factors, will largely determine the desirable catalyst concentration. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is generally preferred.

The polymerization reaction can be conducted over a wide temperature range. Depending upon various factors such as the nature of the monomeric reactant(s) employed, the particular catalyst employed, the concentration of the catalyst, and the like, the reaction temperature can be as low as −20° C., and lower, and as high as 250° C., and higher. A suitable temperature range is from about 0° C. to about 225° C.

In general, the reaction time will vary depending upon the operative temperature, the nature of the monomeric reactant(s) employed, the particular catalyst and concentration employed, the use of an inert normally liquid organic vehicle, and other factors. The reaction time can vary from several seconds to several days depending upon the variables illustrated immediately above. A feasible reaction period is from about a few minutes to about 10 hours, and longer.

The polymerization reaction preferably is initiated in the liquid phase. It is desirable to effect the polymerization reaction under an inert atmosphere, e.g., nitrogen.

The polymeric products of this invention can be prepared via the bulk polymerization, suspension polymerization, or the solution polymerization routes. The polymerization reaction can be carried out in the presence of an inert normally-liquid organic vehicle, such as, for example, aromatitc hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reactant(s) does not appear to be critical. A desirable procedure is to add the catalyst to the reaction zone containing the monomeric reactant(s) and inert organic vehicle, if any. If desired, the catalyst can be in solution or suspension (in an inert normally-liquid organic vehicle). Incremental addititon of catalyst to the reaction zone can be employed. If desired, the above procedure can be reversed, that is, the monomeric reactant(s) per se or as a solution in an inert organic vehicle can be added to the reaction zone containing the catalyst (or a catalyst solution). Also, the catalyst, reactant(s), and inert organic vehicle, if any, can be added to the reaction zone simultaneously. The reaction zone (be it, for example, a closed vessel or an elongated tube) can be fitted with an external heat exchanger to thus control undue temperature fluctuations, or to prevent any possible "run-away" reaction temperature due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

The proportion of the reactant(s), i.e., when more than one reactant is employed, can vary over a wide range. Thus, the concentration of the reactant(s) can be from about 5, and lower, to about 95, and higher, mol percent, based on the total mols of the reactant(s).

Unreacted monomeric reactant oftentimes can be recovered from the reaction product by conventional techniques such as by heating said reaction product under reduced pressure. Removal of unreacted monomeric reactant(s) and/or inert organic vehicle can be accomplished by mechanical means such as treatment of the reaction product in a Marshall Mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously.

The polymers obtained by the processes of the invention are a useful class of polycarbonate compounds and polycarbonate polyester compounds. These polymers can range from viscous liquids to extremely tough solids. The very viscous liquids to relatively low molecular weight, wax-like products are useful in the preparation of cosmetics, polishes, and waxes, and as thickening agents for various lubricants. The polymers can be employed to size cellulosic material or they can be used as anti-static agents in the treatment of fibrous materials. They can also be employed as protective coatings and impregnants. These polymers are also useful as oil additives. The solid polymers are useful for the production of various shaped articles such as brush handles, buttons, lamp bases, toys, and the like. The crystalline polymers can be shaped into useful fibers by conventional means such as by extrusion. The solid crystalline and non-crystalline polymers also are useful in the preparation of films by such techniques as milling on a two-roll mill, calendering, solvent casting, and the like. The polymers are also useful as plasticizers for vinyl resins.

As indicated previously, an additional advantage afforded by the practice of the invention is the preparation of copolymers whose physical characteristics can be "tailor-made" to fit desired fields of applications and uses. For example, by adjusting the concentration of the monomeric charge to a particular polymerization system, copolymers which cover a wide spectrum of properties and characteristics can be prepared, e.g., soft, rubbery polymers to highly crystalline polymers.

In a preferred embodiment, the invention contemplates the preparation of novel substantially linear polycarbonate polymeric products which are characterized by the recurring unit:

(VIII) 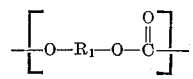

wherein $R_1$ represents a divalent aliphatic chain which contains at least 3 carbon atoms and which is free from ethylenic and acetylenic unsaturation, said $R_1$ being monovalently bonded to both oxy atoms (—O—) in the above structural unit through carbon atoms, and further said $R_1$ contains no more than 4 substituents along the aliphatic chain. The novel homopolymers as well as the novel copolymers which contain halo, nitro, cyanoalkyl, cyanoalkoxymethyl, and/or tertiary amino groups in a recurring unit have average molecular weights in the range of from about 900 to several hundred thousand, and higher. Those novel homopolymers as well as novel copolymers which are composed of carbon, hydrogen, and oxygen atoms, said oxygen atoms being a part of the carbonate group

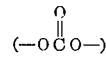

and oftentimes the lactone group

have average molecular weights of from about 10,000 to several hundred thousand, and higher.

In a highly preferred embodiment, the novel substantially linear polycarbonates are characterized by the recurring unit:

(IX) 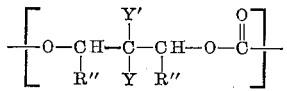

wherein $R''$ can be hydrogen or alkyl, preferably lower alkyl of from 1 to 6 carbon atoms, and wherein Y and Y′ have the same values as assigned in Formula I supra. It is preferred that Unit IX above contain no more than 3 substituents bonded to carbon atoms which form part of the linear chain, and preferably still no more than 2 substituents. It is also preferred that Y be alkyl which preferably contains from 1 to 6 carbon atoms; alkoxymethyl, the alkoxy moiety of which preferably contains from 1 to 6 carbon atoms; alkanoyloxymethyl, the alkanoyl moiety of which preferably contains from 2 to 6 carbon atoms; nitro; cyanoalkyl, the alkyl moiety of which preferably contains from 1 to 4 carbon atoms; haloalkyl, preferably chloroalkyl of 1 to 4 carbon atoms; and cyanoalkoxymethyl, the alkoxy moiety of which preferably contains from 2 to 4 carbon atoms; and Y′ be alkyl which preferably contains from 1 to 6 carbon atoms; alkoxymethyl, the alkoxy moiety of which preferably contains from 1 to 6 carbon atoms; alkanoyloxymethyl, the alkanoyl moiety of which preferably contains from 2 to 6 carbon atoms; cyanoalkyl, the alkyl moiety of which preferably contains from 1 to 4 carbon atoms; haloalkyl, preferably chloroalkyl of 1 to 4 carbon atoms; and cyanoalkoxymethyl, the alkoxy moiety of which preferably contains from 2 to 4 carbon atoms. The novel linear polymers which are characterized by Unit IX have an average molecular weight of at least about 10,000, and preferably at least about 20,000, and preferably still at least about 25,000. The upper average molecular weight can be as high as one million, and higher, and preferably about 500,000.

A particular preferred class of polycarbonate polyester copolymers can be characterized by the following recurring structural units:

(X) 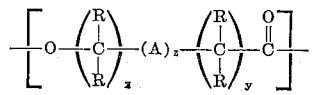

wherein the variables R, A, $x$, $y$, and $z$ have the same values as shown in Formula VII supra; and (XI)

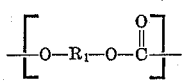

wherein $R_1$ has the meanings set forth in Unit VIII supra. The proportions of each Unit X and Unit XI supra in the novel polymers can be from about 5 to about 95 mol percent, based on the total mols of monomers polymerized therein. It is preferred that in lieu of Unit XI the novel copolymers under consideration contain the recurring unit defined as Unit IX supra. As noted in the discussion re Unit VIII, the average molecular weight of the novel polymers can be at least about 900 or about 10,000 to about several hundred thousand, and higher, e.g., about 1,000,000.

A particularly preferred class of novel polymers are those essentially linear polyester polycarbonate polymers which contain from about 50 to 95 mol percent, and preferably still from about 60 to 90 mol percent, of the following recurring unit:

(XII)

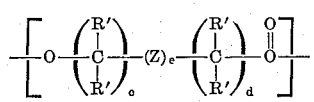

wherein each $R'$, individually, can be hydrogen, alkyl, alkoxy, halo, haloalkyl, and alkoxyalkyl, which preferably contain up to 8 carbon atoms; wherein subscripts $c$ and $d$, individually, are integers having a value greater than zero and less than 5; wherein subscript $e$ is an integer which has a value of zero or one; wherein the sum of $c+d+e$ is an integer greater than one and less than 8, preferably greater than 3 and less than 7, and more preferably the integer 5; and wherein Z is an oxy group, i.e., —O— group, or the unit

wherein the $R'$ variables of said unit have the same values as above; with the provisos (1) that no more than three $R'$ variables attached to the carbon atoms contained in the recurring unit above are groups other than hydrogen, (2) that from 2 to 4 continuously linked carbon atoms contained in said recurring unit can represent a portion of a saturated cycloaliphatic hydrocarbon nucleus which contains from 4 to 10 carbon atoms in said nucleus, preferably from 5 to 7 carbon atoms in said nucleus, (3) that four $R'$ variables attached to any two adjacent carbon atoms contained in said recurring unit can represent a portion of a fused aromatic hydrocarbon nucleus, and (4) wherein the sum of $c+d+e$ cannot be an integer equal to 3. With reference to proviso (2) immediately above, the saturated cycloaliphatic hydrocarbon nucleus can be considered to be derived, for example, from cycloalkane, alkyl-substituted cycloalkane, cyclobutane, cyclopentane, ethylcyclohexane, n-propylcyclohexane, n-octylcyclohexanone, cycloheptane, cyclooctane, and the like. With reference to proviso (3) immediately above, the aromatic hydrocarbon nucleus can be considered to be derived, for example, from benzene, alkylbenzene, ethylbenzene, n-propylbenzene, 2-ethylhexylbenzene, naphthalene, alphamethylnaphthalene, and the like. Specific illustrative radicals falling within the scope of the $R'$ variables of Unit XII are found under the discussion of the R variables of Formula VII supra. In view of economic and practical considerations, it is highly preferred that the $R'$ variables be hydrogen and/or methyl. In addition to Unit XII these particular preferred polyester polycarbonate polymers contain from about 50 to 5 mol percent, and preferably still from about 40 to 10 mol percent of Unit IX characterized supra. It is highly advantageous that in lieu of Unit IX, the novel polymers under discussion contain the following unit:

(XIII)

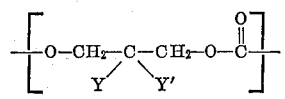

wherein Y and Y' have the meanings assigned in Unit IX supra. The average molecular weight range of the polymers under discussion are found in the discussion re Unit IX.

In a further desirable embodiment, the invention is directed to novel substantially linear polycarbonate polymeric products which are characterized by the recurring unit:

(XIV)

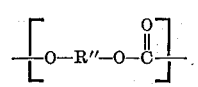

wherein $R''$ represents a divalent alkylene or oxa-alkylene chain of at least 3 carbon atoms and upwards to 18 atoms, preferably 3 carbon atoms in said chain. Moreover, there can be from zero to 4 substituents or groups along said chain which are free from ethylenic and acetylenic unsaturation. It is preferred that these substituents be composed of carbon and hydrogen with or without oxygen atoms, said oxygen being present in the form of etheric oxygen (—O—), esteric oxygen

and/or nitro oxygen (—NO$_2$), e.g., alkyl, aryl, cycloalkyl, alkaryl, aralkyl, alkoxymethyl, haloalkyl, cyanoalkyl, alkanoyloxymethyl, alkoxy, nitro, and aryloxymethyl. It is also preferred that one substituent be nitro, tertiary amino, cyanoalkoxymethyl, or cyanoalkyl. It is especially prefererd that $R''$ of Unit XIV be a 2,2-disubstituted trimethylene radical, for example, 2,2-dialkyltrimethylene, 2,2 - di(cyanoalkoxymethyl)trimethylene, 2,2 - di(haloalkyl)trimethylene, 2,2-di(cyanoalkyl)trimethylene, and the like. It is highly preferred that the alkyl portion and the alkoxy portion of the aforesaid 2,2-disubstituted radicals contain from 1 to 4 carbon atoms.

From an over-all standpoint concerning economics, practical commercial significance, and other factors, 2,2-dimethyltrimethylene, i.e.,

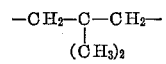

2,2-di(cyanomethyl)trimethylene, 2,2 - di(chloromethyl)trimethylene, and 2,2-di(cyanoethoxymethyl)trimethylene form the saturated $R''$ variable of choice. In addition to recurring Unit XIV the novel polymers can contain from 10 to 90 mol percent of the recurring unit:

(XV)

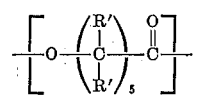

wherein each $R'$ is hydrogen or lower alkyl, preferably hydrogen or methyl, with the proviso that no more than 3 $R'$ variables are substitutents other than hydrogen.

In further preferred embodiments, the invention is directed to novel polymeric products which contain from 5 to about 50 mol percent, preferably from about 10 to about 40 mol percent, of one or more of the following recurring units:

(XVI)

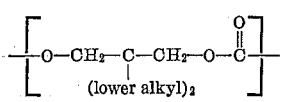

wherein each lower alkyl variable contains from 1 to 6 carbon atoms, preferably 1 to 2 carbon atoms, and preferably still each lower alkyl is methyl; and/or (XVII) 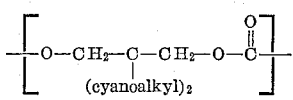

wherein each cyanoalkyl variable contains from 1 to 4 carbon atoms, and preferably wherein each cyanoalkyl variable is cyanomethyl; and/or (XVIII) 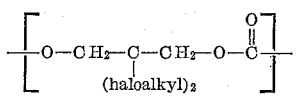

wherein each haloalkyl variable contains from 1 to 4 carbon atoms, and preferably wherein each haloalkyl variable is chloromethyl; and/or (XIX) 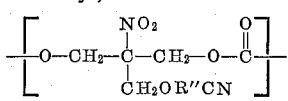

wherein R″ is alkylene, preferably alkylene of 2 to 4 carbon atoms, and preferably still R″ is ethylene

and/or (XX) 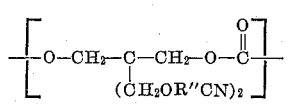

wherein each R″ has the meanings assigned in Unit XIX supra.

In addition to one or more of the recurring units designated as XVI through XX above, these novel polymers can contain from about 50 to 95 mol percent, preferably from about 60 to about 90 mol percent, of the recurring unit:

(XXI) 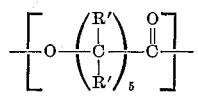

wherein each R′ is hydrogen or lower alkyl, preferably hydrogen or methyl, with the proviso that no more than 3 R′ variables are substituents other than hydrogen. The average molecular weight range of the novel polymers of these embodiments can be at least about 1,200, preferably at least about 4,000, and preferably still at least about 20,000. The upper average molecular weight can be as high as one million, and higher, though an upper average molecular weight of about 500,000 would cover many of the commercially useful applications.

It is pointed out that the recurring linear units which comprise the novel polymers are interconnected through the oxy group (—O—) of one unit with the carbonyl group

of a second unit. In different language, the interconnection of these units does not involve the direct bonding of two carbonyl groups, i.e.,

Moreover, since a wide range of the novel polymers are exceptionally high molecular weight products, the end groups are insignificant since macromolecules are involved. However, the end groups will depend upon the catalyst of choice, the purification techniques of the reaction product mixture, and other factors. Infra-red analysis fails to disclose the terminal moieties of the relatively high molecular weight polymeric molecules. The end groups, in general, are monovalent organic moieties such as hydrocarbyl, hydrocarbyloxy, acyl, etc., e.g., alkyl, alkoxy, aryloxy, alkanoyl, cycloalkyl, and the like. The polymer chain can also be terminated by the metal containing catalyst residue which oftentimes can be removed by conventional purification techniques, exposure to the atmosphere, and other procedures well known in the polymer art. These techniques frequently result in the formation of hydroxy end groups.

In the illustrative operative examples below, the polymerization reaction is generally conducted under an inert atmosphere, e.g., nitrogen. The reaction vessel and contents, e.g., cyclic carbonate(s), catalyst, and inert organic vehicle, if any, are maintained, usually under agitation, in a constant temperature bath, e.g., 90° C., or the reaction vessel containing the cyclic carbonate(s), etc., are maintained, usually under agitation, in a constant temperature bath and subsequently the catalyst is added thereto. Since the polymerization reaction, in general, is exothermic a rise in temperature is observed, e.g., 140° to 150° C. In several instances the period recorded is the time observed in which the rotation of the mechanical stirrer ceases due to the high viscosity of the contents in the reaction vessel. In most cases the reaction vessel is left in the constant temperature bath for an additional period of time, e.g., about 20 minutes, or longer.

By the term "reduced viscosity" is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solution. This reduced viscosity value is an indication of the molecular weight of the polymeric gum stock. Unless otherwise indicated, the reduced viscosity value is measured at a concentration of 0.4 gram of said polymeric gum stock in 100 milliliters of chloroform (or other common solvent) at 30° C.

The examination of the polymeric products are conducted at ambient temperature, e.g., about 23° C., unless otherwise indicated. The proportions of the ingredients are in parts by weight, unless otherwise inidcated.

*Example 1*

To a reaction vessel which is equipped with a stirrer and nitrogen inlet tube, there is charged 100 parts of 4,4-dimethyl-2,6-dioxacyclohexanone. The reaction vessel, the contents of which are maintained under a nitrogen atmosphere, is heated to about 50° C. Thereafter, 0.3 part of n-butyllithium, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a tough, solid homopolymer.

*Example 2*

To a reaction vessel which is equipped with a stirrer and nitrogen inlet tube, there is charged 100 parts of trimethylene carbonate. The reaction vessel, the contents of which are maintained under a nitrogen atmosphere, is heated to about 70 C. Thereafter, 0.3 part of n-butyllithium, as the catalyst therefor, is added to said reaction vessel. Within a short period, the mechanical stirrer ceases due to the high viscosity of the contents in the reaction vessel. After a period of 30 minutes, the resulting reaction product is recovered from the reaction vessel, dissolved in chloroform, and reprecipitated in petroleum ether. There is obtained a hard solid homopolymer.

*Example 3*

To a reaction vessel which is equipped with a stirrer and nitrogen inlet tube, there is charged 100 parts of 4-nitro-4-methyl - 2,6-dioxacyclohexanone. The reaction vessel, the contents of which are maintained under a nitrogen atmosphere, is heated to about 90° C. Thereafter, 0.5 part of di-n-butylzinc, as the catalyst therefor, is added to said reaction vessel. Within a short period, the mechanical stirrer ceases due to the high viscosity of the contents in the reaction vessel. After a period of 40 minutes, the resulting reaction product is recovered from the reaction vessel, dissolved in chloroform, and reprecipitated in petroleum ether. There is obtained a hard solid homopolymer.

Example 4

To a reaction vessel which is equipped with a stirrer and nitrogen inlet tube, there is charged 100 parts of 4-ethyl-4-ethoxymethyl-2,6-dioxacyclohexanone. The reaction vessel, the contents of which are maintained under a nitrogen atmosphere, is heated to about 90° C. Thereafter, 0.5 part of dimethylcadmium, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a solid homopolymer.

Example 5

To a reaction vessel which is equipped with a stirrer and nitrogen inlet tube, there is charged 100 parts of 3-oxo-8-thia-2,4-dioxaspiro[5.3]nonane. The reaction vessel, the contents of which are maintained under a nitrogen atmosphere, is heated to about 90° C. Thereafter, 0.8 part of n-butyllithium, as the catalyst therefor, is added to said reaction vessel. Within a short period, the mechanical stirrer ceases due to the high viscosity of the contents in the reaction vessel. After a period of 1.5 hours, the resulting reaction product is recovered from the reaction vessel, dissolved in chloroform, and reprecipitated in petroleum ether. There is obtained a solid homopolymer.

Example 6

To a reaction vessel which is equipped with a stirrer and nitrogen inlet tube, there is charged 100 parts of 4,4-di-(chloromethyl)-2,6-dioxacyclohexanone. The reaction vessel, the contents of which are maintained under a nitrogen atmosphere, is heated to about 90° C. Thereafter, 1.0 part of diethylzinc, as the catalyst therefor, is added to said reaction vessel. Within a short period, the mechanical stirrer ceases due to the high viscosity of the contents in the reaction vessel. After a period of two hours, the resulting reaction product is recovered from the reaction vessel, dissolved in chloroform, and reprecipitated in petroleum ether. There is obtained a solid homopolymeric product.

Example 7

To a reaction vessel which is equipped with a stirrer and nitrogen inlet tube, there is charged 100 parts of 4,4-di(cyanomethyl)-2,6-dioxacyclohexanone. The reaction vessel, the contents of which are maintained under a nitrogen atmosphere, is heated to about 90° C. Thereafter, 1.2 parts of triisobutylaluminum, as the catalyst therefor, is added to said reaction vessel. Within a short period, the mechanical stirrer ceases due to the high viscosity of the contents in the reaction vessel. After a period of 1.5 hours, the resulting reaction product is recovered from the reaction vessel, dissolved in chloroform, and reprecipitated in petroleum ether. There is obtained a solid homopolymeric product.

Example 8

To a reaction vessel which is equipped with a stirrer and nitrogen inlet tube, there is charged 100 parts of tetraethylene glycol carbonate. The reaction vessel, the contents of which are maintained under a nitrogen atmosphere, is heated to about 90° C. Thereafter, 1.5 parts of n-butyllithium, as the catalyst therefor, is added to said reaction vessel. Within a short period, the mechanical stirrer ceases due to the high viscosity of the contents in the reaction vessel. After a period of two hours, the resulting reaction product is recovered from the reaction vessel, dissolved in chloroform, and reprecipitated in petroleum ether. There is obtained a solid homopolymeric product.

Example 9

To a reaction vessel which is equipped with a stirrer and nitrogen inlet tube, there is charged 100 parts of 3,4,5-trimethyl-2,6-dioxacyclohexanone. The reaction vessel, the contents of which are maintained under a nitrogen atmosphere, is heated to about 90° C. Thereafter, 1.5 parts of equimolar quantities of aluminum triisopropoxide-zinc chloride, as the co-catalyst system therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a waxy solid.

Example 10

To a reaction vessel which is equipped with a stirrer and nitrogen inlet tube, there is charged 100 parts of 3-chloromethyl-2,6-dioxacyclohexanone. The reaction vessel, the contents of which are maintained under a nitrogen atmosphere, is heated to about 90° C. Thereafter, 0.5 part of the reaction product of equimolar quantities of triisobutylaluminum and water, as the catalyst therefor, is added to said reaction vessel. Within a short period, the mechanical stirrer ceases due to the high viscosity of the contents in the reaction vessel. After a period of 30 minutes, the resulting reaction product is recovered from the reaction vessel, dissolved in chloroform, and reprecipitated in petroleum ether. There is obtained a tough, a solid homopolymeric product.

Example 11

To a reaction vessel which is equipped with a stirrer and nitrogen inlet tube, there is charged 100 parts of 3-phenyl-2,6-dioxacyclohexanone. The reaction vessel, the contents of which are maintained under a nitrogen atmosphere, is heated to about 90° C. Thereafter, 0.6 part of triethylaluminum, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a waxy solid.

Example 12

To a reaction vessel which is equipped with a stirrer and nitrogen inlet tube, there is charged 65 parts of 3,4,5-trimethyl-2,6-dioxacyclohexanone and 35 parts of 3-oxo-2,4,7-trioxaspiro[4.5]decane. The reaction vessel, the contents of which are maintained under a nitrogen atmosphere, is heated to about 90° C. Thereafter, 1.2 parts of diethylaluminum chloride, as the catalyst therefor, is added to said reaction vessel. After a period of two hours, the resulting reaction product is dissolved in chloroform and recovered from petroleum ether. There is obtained a viscous liquid.

Example 13

To a reaction vessel which is equipped with a stirrer and nitrogen inlet tube, there is charged 100 parts of 3-oxo-2,4,8,10-tetraoxa-9-thiaspiro[5.5]undecane-9-oxide. The reaction vessel, the contents of which are maintained under a nitrogen atmosphere, is heated to about 90° C.

Thereafter, 0.6 part of ethylberyllium chloride, as the catalyst therefor, is added to said reaction vessel. After a period of one hour, the resulting reaction product is dissolved in chloroform and recovered from petroleum ether. There is obtained a viscous liquid.

*Example 14*

To a reaction vessel which is equipped with a stirrer and nitrogen inlet tube, there is charged 100 parts of 4,4-di(ethoxymethyl)-2,6-dioxacyclohexanone. The reaction vessel, the contents of which are maintained under a nitrogen atmosphere, is heated to about 90° C. Thereafter, 1.2 parts of dimethylmagnesium, as the catalyst therefor, is added to said reaction vessel. Within a short period, the mechanical stirrer ceases due to the high viscosity of the contents in the reaction vessel. After a period of two hours, the resulting reaction product is recovered from the reaction vessel, dissolved in chloroform, and reprecipitated in petroleum ether. There is obtained a waxy solid.

*Example 15*

To a reaction vessel which is equipped with a stirrer and nitrogen inlet tube, there is charged 100 parts of 4,4-di(acetoxymethyl)-2,6-dioxacyclohexanone. The reaction vessel, the contents of which are maintained under a nitrogen atmosphere, is heated to about 90° C. Thereafter, 1.5 parts of ethylaluminum dichloride, as the catalyst therefor, is added to said reaction vessel. Within a short period, the mechanical stirrer ceases due to the high viscosity of the contents in the reaction vessel. After a period of 1.5 hours, the resulting reaction product is recovered from the reaction vessel, dissolved in chloroform, and reprecipitated in petroleum ether. There is obtained a waxy solid.

*Example 16*

To a reaction vessel which is equipped with a stirrer and nitrogen inlet tube, there is charged 100 parts of 4-diethylamino-4-methyl-2,6-dioxacyclohexanone. The reaction vessel, the contents of which are maintained under a nitrogen atmosphere, is heated to about 90° C. Thereafter, 1.0 part of the reaction product of equimolar quantities of diethylzinc and water, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a hard, solid homopolymeric product.

*Example 17*

To a reaction vessel which is equipped with a stirrer and nitrogen inlet tube, there is charged 65 parts of 4,4-dimethyl-2,6-dioxacyclohexanone and 35 parts of epsilon-caprolactone. The reaction vessel, the contents of which are maintained under a nitrogen atmosphere, is heated to about 50° C. Thereafter, 0.5 part of n-butyllithium, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a tough, hard, solid copolymeric product.

*Example 18*

To a reaction vessel which is equipped with a stirrer and nitrogen inlet tube, there is charged 30 parts of 4,4-dimethyl-2,6-dioxacyclohexanone and 70 parts of epsilon-caprolactone. The reaction vessel, the contents of which are maintained under a nitrogen atmosphere, is heated to about 90° C. Thereafter, 0.6 part of dimethylcadmium, as the catalyst therefor, is added to said reaction vessel. Within a short period, the mechanical stirrer ceases due to the high viscosity of the contents in the reaction vessel. After a period of 0.5 hour, the resulting reaction product is recovered from the reaction vessel, dissolved in chloroform, and reprecipitated in petroleum ether. There is obtained a tough, hard, solid copolymeric product.

*Example 19*

To a reaction vessel which is equipped with a stirrer and nitrogen inlet tube, there is charged 15 parts of 4,4-dimethyl-2,6-dioxacyclohexanone and 85 parts of epsilon-caprolactone. The reaction vessel, the contents of which are maintained under a nitrogen atmosphere, is heated to about 90° C. Thereafter, 1.0 part of di-n-butylzinc, as the catalyst therefor, is added to said reaction vessel. Within a short period, the mechanical stirrer ceases due to the high viscosity of the contents in the reaction vessel. After a period of 0.5 hour, the resulting reaction product is recovered from the reaction vessel, dissolved in chloroform, and reprecipitated in petroleum ether. There is obtained a tough, hard, solid copolymeric product.

*Example 20*

To a reaction vessel which is equipped with a stirrer and nitrogen inlet tube, there is charged 20 parts of 4,4-dimethyl-2,6-dioxacyclohexanone and 80 parts of epsilon-caprolactone. The reaction vessel, the contents of which are maintained under a nitrogen atmosphere, is heated to about 90° C. Thereafter, one part of the reaction product of equimolar quantities of diethylzinc and water, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a tough, hard, solid copolymeric product.

*Example 21*

To a reaction vessel which is equipped with a stirrer and nitrogen inlet tube, there is charged 25 parts of 4,4-dimethyl-2,6-dioxacyclohexanone and 75 parts of epsilon-caprolactone. The reaction vessel, the contents of which are maintained under a nitrogen atmosphere, is heated to about 50° C. Thereafter, one part of the reaction product of equimolar quantities of triisobutylaluminum and water, as the catalyst therefor, is added to said reaction vessel. Within a short period, the mechanical stirrer ceases due to the high viscosity of the contents in the reaction vessel. After a period of 20 minutes, the resulting reaction product is recovered from the reaction vessel, dissolved in chloroform, and reprecipitated in petroleum ether. There is obtained a tough, hard, solid copolymeric product.

*Example 22*

To a reaction vessel which is equipped with a stirrer and nitrogen inlet tube, there is charged 35 parts of 4,4-dimethyl-2,6-dioxacyclohexanone and 65 parts of epsilon-caprolactone. The reaction vessel, the contents of which are maintained under a nitrogen atmosphere, is heated to about 90° C. Thereafter, one part of equimolar quantities of aluminum isopropoxide and zinc chloride, as the co-catalyst system therefor, is added to said reaction vessel. Within a short period, the mechanical stirrer ceases due to the high viscosity of the contents in the reaction vessel. After a period of two hours, the resulting reaction product is recovered from the reaction vessel, dissolved in chloroform, and reprecipitated in petroleum ether. There is obtained a hard, solid copolymeric product.

*Example 23*

To a reaction vessel which is equipped with a stirrer and nitrogen inlet tube, there is charged 30 parts of 4-nitro-4-methyl-2,6-dioxacyclohexanone and 70 parts of epsilon-caprolactone. The reaction vessel, the contents of which are maintained under a nitrogen atmosphere, is heated to about 90° C. Thereafter, 0.6 part of n-butyllithium, as the catalyst therefor, is added to said reaction vessel. Within a short period, the mechanical stirrer ceases due to the high viscosity of the contents in the reaction vessel. After a period of 0.5 hour, the resulting reaction product is recovered from the reaction vessel, dissolved in chloroform, and reprecipitated in petroleum ether. There is obtained a hard, solid copolymeric product.

*Example 24*

To a reaction vessel which is equipped with a stirrer and nitrogen inlet tube, there is charged 30 parts of 4,4-di(chloromethyl)-2,6-dioxacyclohexanone and 70 parts of epsilon-caprolactone. The reaction vessel, the contents of which are maintained under a nitrogen atmosphere, is heated to about 80° C. Thereafter, 0.8 part of di-n-butylzinc, as the catalyst therefor, is added to said reaction vessel. Within a short period, the mechanical stirrer ceases due to high viscosity of the contents in the reaction vessel. After a period of one hour, the resulting reaction product is recovered from the reaction vessel, dissolved in chloroform, and reprecipitated in petroleum ether. There is obtained a hard, solid copolymeric product.

*Example 25*

To a reaction vessel which is equipped with a stirrer and nitrogen inlet tube, there is charged 20 parts of 4,4-di-(cyanomethyl)-2,6-dioxacyclohexanone and 80 parts of epsilon-caprolactone. The reaction vessel, the contents of which are maintained under a nitrogen atmosphere, is heated to about 90° C. Thereafter, 0.5 part of dimethylcadmium, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a hard, solid copolymeric product.

*Example 26*

To a reaction vessel which is equipped with a stirrer and nitrogen inlet tube, there is charged 50 parts of 4,4-dimethyl-2,6-dioxacyclohexanone, 10 parts of delta-valerolactone, and 40 parts of 2-keto-1,4-dioxane. The reaction vessel, the contents of which are maintained under a nitrogen atmosphere, is heated to about 80° C. Thereafter, 1.0 part of dimethylcadmium, as the catalyst therefor, is added to said reaction vessel. Within a short period, the mechanical stirrer ceases due to the high viscosity of the contents in the reaction vessel. After a period of 1.5 hours, the resulting reaction product is recovered from the reaction vessel, dissolved in chloroform, and reprecipitated in petroleum ether. There is obtained a solid copolymeric product.

*Example 27*

To a reaction vessel which is equipped with a stirrer and nitrogen inlet tube, there is charged 50 parts of 4-nitro-4-methyl-2,6-dioxacyclohexanone and 50 parts of zeta-enantholactone. The reaction vessel, the contents of which are maintained under a nitrogen atmosphere, is heated to about 60° C. Thereafter, 1.5 parts of di-n-butylzinc, as the catalyst therefor, is added to said reaction vessel. Within a short period, the mechanical stirrer ceases due to the high viscosity of the contents in the reaction vessel. After a period of two hours, the resulting reaction product is recovered from the reaction vessel, dissolved in chloroform, and reprecipitated in petroleum ether. There is obtained a hard, solid copolymeric product.

*Example 28*

To a reaction vessel which is equipped with a stirrer and nitrogen inlet tube, there is charged 50 parts of 3,4,5-trimethyl-2,6-dioxacyclohexanone and 50 parts of gamma (1-isopropyl-4-methylcyclohexyl)-epsilon - caprolactone. The reaction vessel, the contents of which are maintained under a nitrogen atmosphere, is heated to about 90° C. Thereafter, 0.8 part of dimethylcadmium, as the catalyst therefor, is added to said reaction vessel. After a period of 1.5 hours, the resulting reaction product is dissolved in chloroform and recovered from petroleum ether. There is obtained a viscous liquid product.

*Example 29*

To a reaction vessel which is equipped with a stirrer and nitrogen inlet tube, there is charged 10 parts of octadecamethylene carbonate and 90 parts of epsilon-caprolactone. The reaction vessel, the contents of which are maintained under a nitrogen atmosphere, is heated to about 95° C. Thereafter, 1.5 parts of diisopropylmagnesium, as the catalyst therefor, is added to said reaction vessel. Within a short period, the mechanical stirrer ceases due to the high viscosity of the contents in the reaction vessel. After a period of four hours, the resulting reaction product is recovered from the reaction vessel, dissolved in chloroform, and reprecipitated in petroleum ether. There is obtained a solid copolymeric product.

*Example 30*

To a reaction vessel which is equipped with a stirrer and nitrogen inlet tube, there is charged 50 parts of 4,4-dimethyl-2,6-dioxacyclohexanone and 50 parts of beta-propiolactone. The reaction vessel, the contents of which are maintained under a nitrogen atmosphere, is heated to about 90° C. Thereafter, 0.6 part of dimethylcadmium, as the catalyst therefor, is added to said reaction vessel. Within a short period, the mechanical stirrer ceases due to the high viscosity of the contents in the reaction vessel. After a period of 1.5 hours, the resulting reaction product is recovered from the reaction vessel, dissolved in chloroform, and reprecipitated in petroleum ether. There is obtained a solid copolymeric product.

*Example 31*

To a reaction vessel which is equipped with a stirrer and nitrogen inlet tube, there is charged 70 parts of 4,4-dimethyl-2,6-dioxacyclohexanone and 30 parts of alpha, alpha-dimethyl-beta-propiolactone. The reaction vessel, the contents of which are maintained under a nitrogen atmosphere, is heated to about 90° C. Thereafter, 0.5 part of n-butyllithium, as the catalyst therefor, is added to said reaction vessel. Within a short period, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a tough, hard copolymeric product.

*Example 32*

To a reaction vessel which is equipped with a stirrer and nitrogen inlet tube, there is charged 40 parts of 4,4-dimethyl-2,6-dioxacyclohexanone, 30 parts of epsilon-caprolactone, and 30 parts of alpha, alpha-dimethyl-beta-propiolactone. The reaction vessel, the contents of which are maintained under a nitrogen atmosphere, is heated to about 70° C. Thereafter, 0.6 part of n-butyllithium, as the catalyst therefor, is added to said reaction vessel. Within a short period, the mechanical stirrer ceases due to the high viscosity of the contents in the reaction vessel. After a period of two hours, the resulting reaction product is recovered from the reaction vessel, dissolved in chloroform, and reprecipitated in petroleum ether. There is obtained a hard, solid copolymeric product.

*Example 33*

To a reaction vessel which is equipped with a stirrer and nitrogen inlet tube, there is charged 60 parts of 4-nitro-4-propanoyloxy-methyl-2,6-dioxacyclohexanone and 40 parts of 2,4-dimethyl-4-methoxymethyl-5-hydroxypentanoic acid lactone. The reaction vessel, the contents of which are maintained under a nitrogen atmosphere, is heated to about 90° C. Thereafter, 0.8 part of vinylmagnesium chloride, as the catalyst therefor, is added to said reaction vessel. After a period of two hours, the resulting reaction product is recovered from the reaction vessel, dissolved in chloroform, and reprecipitated in petroleum ether. There is obtained a soft, waxy copolymeric product.

*Example 34*

To a reaction vessel which is equipped with a stirrer and nitrogen inlet tube, there is charged 70 parts of 4,4-dimethyl-2,6-dioxacyclohexanone and 30 parts of 12-oxa-15-hydroxypentadecanoic acid lactone. The reaction vessel, the contents of which are maintained under a nitrogen atmosphere, is heated to about 90° C. Thereafter, 1.0 part of n-butyllithium, as the catalyst therefor, is added to said reaction vessel. Within a short period, the mechanical stirrer ceases due to the high viscosity of the contents in the reaction vessel. After a period of three hours, the resulting reaction product is recovered from the reaction vessel, dissolved in chloroform, and reprecipitated in petroleum ether. There is obtained a soft solid product.

*Examples 35–45*

In Examples 35–45, various homopolymers and copolymers are prepared using a variety of catalysts. The concentration of the catalysts in these examples is 0.5 weight percent, based on the weight of the monomeric charge. The reaction temperature is 90° C. The polymerization time is the time observed in which the rotation of the mechanical stirrer ceases due to the extremely high viscosity of the contents in the reaction vessel. In general, however, the reaction vessel is left in the constant temperature bath for an additional period of time, e.g., about 20 minutes, or longer. The conversion of monomer to polymer is substantially quantitative. The pertinent data are set forth in Table I infra.

TABLE I

| Example No. | Monomer | Catalyst | Polymerization Time [7] | Reduced Viscosity [1] | Remarks |
|---|---|---|---|---|---|
| 35 | Trimethylene Carbonate. | p-Toluenesulfonic acid. | 20 days | [2] 0.10-C | Viscous liquid. |
| 36 | ----do---- | (n-$C_4H_9$)Li | <1.5 min | [2] 1.40 | Very tough, flexible, non-crystalline solid. |
| 37 | ----do---- | $SnCl_4$ | 20 min | [2] 0.83-C | Slightly tough, flexible, non-crystalline solid. |
| 38 | ----do---- | (n-$C_4H_9$)$_2$Zn | <1 min | [2] 0.67-C | Slightly tough, flexible, non-crystalline solid. |
| 39 | ----do---- | (n-$C_4H_9$)$_2$Zn | 2 min | [2] 1.00-C | Tough, flexible, non-crystalline solid. |
| 40 | ----do---- | ([6]) | <1 min | [2] 1.03-C | Tough, flexible, non-crystalline solid. |
| 41 | ----do---- | (n-$C_4H_9$)Li | <1 min | [2] 1.29-C | Very tough, non-crystalline solid. |
| 42 | 80:20 [5] | (n-$C_4H_9$)$_2$Zn | ([3]) | [2] 0.46-C | Slightly tough, waxy solid. |
| 43 | ----do [5] | (n-$C_4H_9$)$_2$Zn | <1 min | [4] 1.70-C [4] 1.12-C | Extremely tough, slightly elastic solid. |
| 44 | 70:30 [5] | (n-$C_4H_9$)$_2$Zn | 5 min | [2] 1.95-C [2] 1.27-B | Tough, slightly crystalline solid; soluble in acetone. |
| 45 | 75:25 [5] | (n-$C_4H_9$)$_2$Zn | 2.5 min | [2] 1.84-C | Non-crystalline, tough, white solid. |

[1] Reduce Viscosity: C designates measurement of 0.4 gram per 100 ml. of chloroform at 30° C.; B designates measurement of 0.2 gram per 100 ml. of benzene at 30° C.
[2] Precipitated from chloroform with petroleum ether before measurement.
[3] Polymerization reaction commences immediately upon addition of one drop of $H_2O$.
[4] Milled before measurement.
[5] Weight ratio of epsilon-caprolactone to trimethylene carbonate.
[6] Catalyst is the so-called "doubly modified" calcium amide prepared as set forth in Example 1 of U. S. 2,969,402 except that 40 parts by weight of Ca metal, 29 parts by weight of acetonitrile, and 40 parts by weight of propylene oxide, were employed.
[7] Time for mechanical stirrer to cease due to the high viscosity of the contents in reaction vessel.

*Examples 46–53*

In Examples 46 to 53, various homopolymers and copolymers are prepared using a variety of catalysts. The reaction temperature is 90° C. The polymerization time is the time observed in which the rotation of the mechanical stirrer ceases due to the extremely high viscosity of the contents in the reaction vessel. In general, however, the reaction vessel is left in the constant temperature bath for an additional period of time, e.g., about 20 minutes, or longer. The conversion of monomer to polymer is substantially quantitative. The pertinent data are set forth in Table II infra.

TABLE II

| Example No. | Monomer | Catalyst | Catalyst Concentration[1] | Polymerization Time, (minutes)[2] | Reduced Viscosity [3] |
|---|---|---|---|---|---|
| 46 | Trimethylene Carbonate | (n-$C_4H_9$)Li | 0.5 | 3 | 0.57 |
| 47 | ----do---- | $(CH_3)_2Cd$ | 0.5 | 3 | 0.60 |
| 48 | 70:30 [4] | (n-$C_4H_9$)Li | 0.2 | 7 | 0.49 |
| 49 | 50:50 [5] | $(CH_3)_2Cd$ | 0.4 | 4 | [8] 0.68 |
| 50 | ([6]) | (n-$C_4H_9$)Li | 0.14 | <4 | 0.6 |
| 51 | ([6]) | $(CH_3)_2Cd$ | 0.33 | <4 | 1.9 |
| 52 | ([6]) | (n-$C_4H_9$)$_2$Zn | 0.33 | <4 | 0.45 |
| 53 | ([7]) | $(CH_3)_2Cd$ | 1.5 | <5 | ([9]) |

[1] Weight percent, based on weight of monomer(s).
[2] Time for mechanical stirrer to cease due to the high viscosity of the contents in the reaction vessel.
[3] Reduced viscosity as measured by dissolving 0.4 gram of polymer in 100 ml. of chloroform at 30° C. except for Examples 49 and 53.
[4] Weight ratio of trimethylene carbonate to epsilon-caprolactone.
[5] Weight ratio of trimethylene carbonate to 4,4-dimethyl-2,6-dioxacyclohexanone.
[6] 4,4-Dimethyl-2,6-dioxacyclohexanone.
[7] 4,4-Di(chloromethyl)-2,6-dioxacyclohexanone.
[8] Reduced viscosity as measured using 0.2 gram of polymer in 100 ml. of benzene at 30° C.
[9] Polymer originally soluble in chloroform. After recrystallization from petroleum ether product no longer soluble in chloroform. Melting point 142°–144° C.

Example 54

To a reaction vessel maintained under a nitrogen atmosphere, there is charged 50 grams of epsilon-caprolactone and 50 grams of 4,4-dimethyl-2,6-dioxacyclohexanone. The reaction vessel then is placed in a constant temperature bath maintained at 90° C., and 1.0 gram of di-n-butylzinc (as a 20 weight percent solution in benzene) is added thereto. After a period of 3 minutes, a viscous mass is observed. Upon cooling to room temperature, there is obtained a tough, white solid which has a reduced viscosity value of 1.4.

Example 55

To a reaction vessel which is equipped with a stirrer and nitrogen inlet tube, there is charged 100 parts of 4,4-dimethyl-2,6-dioxacyclohexanone. The reaction vessel, the contents of which are maintained under a nitrogen atmosphere, is heated to about 90° C. Thereafter, 1.0 part of calcium amide-ethylate (prepared as set forth in Example 1 of U.S. 3,062,755), as the catalyst therefor, is added to said reaction vessel. Within a short period of time, the mechanical stirrer ceases due to the high viscosity of the contents in the reaction vessel. After a period of one hour, the reulting reaction product is recovered from the reaction vessel, dissolved in chloroform, and reprecipitated in petroleum ether. There is obtained a tough solid homopolymeric product.

Example 56

To a reaction vessel which is equipped with a stirrer and nitrogen inlet tube, there is charged 100 parts of 4,4-di(chloromethyl)-2,6-dioxacyclohexanone. The reaction vessel, the contents of which are maintained under a nitrogen atmosphere, is heated to about 90° C. Thereafter, 1.0 part of calcium amide-propylate (prepared as set forth in Example 8 of U.S. 3,062,755), as the catalyst therefor, is added to said reaction vessel. Within a short period of time, the mechanical stirrer ceases due to the high viscosity of the contents in the reaction vessel. After a period of 0.5 hour the resulting reaction product is recovered from the reaction vessel, dissolved in chloroform, and reprecipitated in petroleum ether. There is obtained a hard, solid homopolymeric product.

Example 57

To a reaction vessel which is equipped with a stirrer and nitrogen inlet tube, there is charged 100 parts of 3-chloromethyl)-2,6-dioxacyclohexanone. The reaction vessel, the contents of which are maintained under a nitrogen atmosphere, is heated to about 90° C. Thereafter, 1.0 part of the reaction product of calcium, acetonitrile, and propylene oxide (prepared as set forth in Example 6 of U.S. 3,037,943), as the catalyst therefor, is added to said reaction vessel. Within a short period of time, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a hard, tough solid homopolymeric product.

Example 58

To a reaction vessel which is equipped with a stirrer and nitrogen inlet tube, there is charged 20 parts of 4,4-di(cyanomethyl)-2,6-dioxacyclohexanone and 80 parts of epsilon-caprolactone. The reaction vessel, the contents of which are maintained under a nitrogen atmosphere, is heated to about 90° C. Thereafter, 1.0 part of the reaction product of calcium, ethylene oxide, and acetonitrile (prepared as set forth in Example 5 of U.S. 3,037,943), as the catalyst therefor, is added to said reaction vessel. Within a short period of time, the mechanical stirrer ceases due to the high viscosity of the contents in the reaction vessel. After a period of one hour, the resulting reaction product is recovered from the reaction vessel, dissolved in chloroform, and reprecipitated in petroleum ether. There is obtained a hard solid homopolymeric product.

What is claimed is:

1. A solid copolymer which contains from about 50 to 95 mol percent of the recurring unit:

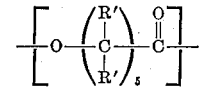

wherein R' is of the group consisting of hydrogen and lower alkyl, with the proviso that no more than 3 R' variables are substituents other than hydrogen; and from about 50 to 5 mol percent of the recurring unit:

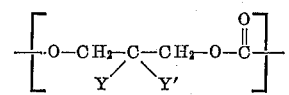

wherein Y is of the group consisting of alkyl, alkoxymethyl, alkanoyloxymethyl, nitro, cyanoalkyl, cyanoalkoxymethyl, and chloroalkyl; wherein Y' is of the group consisting of alkyl, alkoxymethyl, alkanoyloxymethyl, cyanoalkyl, cyanoalkoxymethyl, and chloroalkyl; and wherein the average molecular weight is at least about 10,000; and said copolymer being characterized in that the recurring units are essentially interconnected through the oxy group of one unit with the carbonyl group of a second unit.

2. A copolymer which contains from 5 to about 50 mol percent of the recurring unit:

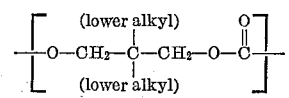

and from 95 to about 50 mol percent of the recurring unit:

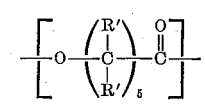

wherein R' is of the group consisting of hydrogen and lower alkyl with the proviso that no more than 3 R' variables are substituents other than hydrogen; and wherein the average molecular weight is at least about 1200; and said copolymer being characterized in that the recurring units are essentially interconnected through the oxy group of one unit with the carbonyl group of a second unit.

3. The copolymer of claim 2 wherein the average molecular weight is at least about 20,000.

4. A copolymer which contains from 5 to about 50 mol percent of the recurring unit:

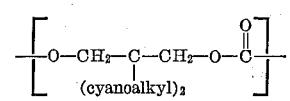

wherein each cyanoalkyl variable contains from 1 to 4 carbon atoms, and from 95 to about 50 mol percent of the recurring unit:

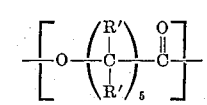

wherein R' is of the group consisting of hydrogen and lower alkyl, with the proviso that no more than 3 R' variables are substituents other than hydrogen; and wherein the average molecular weight is at least about 1200; and said copolymer being characterized in that the recurring units are essentially interconnected through the oxy group of one unit with the carbonyl group of a second unit.

5. The copolymer of claim 4 wherein the average molecular weight is at least about 20,000.

6. A copolymer which contains from 5 to about 50 mol percent of the recurring unit:

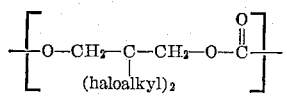

wherein each haloalkyl variable contains from 1 to 4 carbon atoms, and from 95 to about 50 mol percent of the recurring unit:

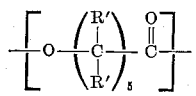

wherein R' is of the group consisting of hydrogen and lower alkyl, with the proviso that no more than 3 R' variables are substituents other than hydrogen; and wherein the average molecular weight is at least about 1200; and said copolymer being characterized in that the recurring units are essentially interconnected through the oxy group of one unit with the carbonyl group of a second unit.

7. The copolymer of claim 6 wherein the average molecular weight is at least about 20,000.

8. A copolymer which contains from 5 to about 50 mol percent of the recurring unit:

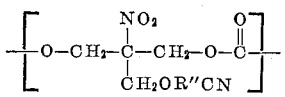

wherein R'' is an alkylene group of from 2 to 4 carbon atoms, and from 95 to about 50 mol percent of the recurring unit:

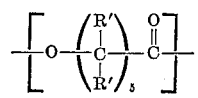

wherein R' is of the group consisting of hydrogen and lower alkyl, with the proviso that no more than 3 R' variables are substituents other than hydrogen; and wherein the average molecular weight is at least about 1200; and said copolymer being characterized in that the recurring units are essentially interconnected through the oxy group of one unit with the carbonyl group of a second unit.

9. The copolymer of claim 8 wherein the average molecular weight is at least about 20,000.

10. A copolymer which contains from 5 to about 50 mol percent of the recurring unit:

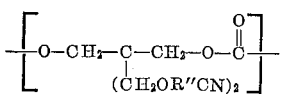

wherein each R'' is an alkylene group of from 2 to 4 carbon atoms, and from 95 to about 50 mol percent of the recurring unit:

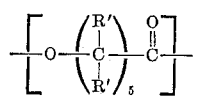

wherein R' is of the group consisting of hydrogen and lower alkyl, with the proviso that no more than 3 R' variables are substituents other than hydrogen; and wherein the average molecular weight is at least about 1200; and said copolymer being characterized in that the recurring units are essentially interconnected through the oxy group of one unit with the carbonyl group of a second unit.

11. The copolymer of claim 10 wherein the average molecular weight is at least about 20,000.

12. A copolymer which contains from 5 to about 50 mol percent of the recurring unit:

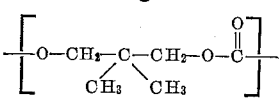

and from 95 to about 50 mol percent of the recurring unit:

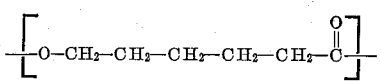

and wherein the average molecular weight is at least about 1200; and said copolymer being characterized in that the recurring units are essentially interconnected through the oxy group of one unit with the carbonyl group of a second unit.

13. The copolymer of claim 12 wherein the average molecular weight is at least about 20,000.

14. A copolymer which contains from 5 to about 50 mol percent of the recurring unit:

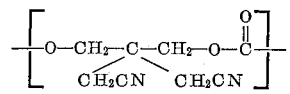

and from 95 to about 50 mol percent of the recurring unit:

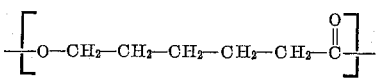

and wherein the average molecular weight it at least about 1200; and said copolymer being characterized in that recurring units are essentially interconnected through the oxy group of one unit with the carbonyl group of a second unit.

15. The copolymer of claim 14 wherein the average molecular weight is at least about 20,000.

16. A copolymer which contains from 5 to about 50 mol percent of the recurring unit:

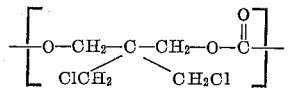

and from 95 to about 50 mol percent of the recurring unit:

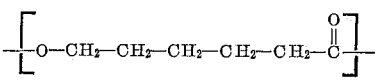

and wherein the average molecular weight is at least about 1200; and said copolymer being characterized in that the recurring units are essentially interconnected through the oxy group of one unit with the carbonyl group of a second unit.

17. The copolymer of claim 16 wherein the average molecular weight is at least about 20,000.

References Cited by the Examiner

UNITED STATES PATENTS

| | | | |
|---|---|---|---|
| 2,210,817 | 8/1940 | Peterson | 260—77.5 |
| 2,517,965 | 8/1950 | Bohl | 260—77.5 |
| 2,789,968 | 4/1957 | Reynolds et al | 260—77.5 |
| 3,021,310 | 2/1962 | Cox et al. | 260—78.3 |
| 3,030,331 | 4/1962 | Goldberg | 260—77.5 |
| 3,046,255 | 7/1962 | Strain et al. | 260—77.5 |
| 3,063,968 | 11/1962 | Schultz | 260—78.3 |
| 3,155,683 | 11/1964 | Moody | 260—47 X |
| 3,157,622 | 11/1964 | Goldberg | 260—77.5 |
| 3,169,121 | 2/1965 | Goldberg | 260—47 X |

FOREIGN PATENTS 1,306,250  9/1962  France.

OTHER REFERENCES

Furukawa et al.: "Makromolekulare Chemie," vol. 32 (1959) pp. 90–94 (QD 281 P6 M2).

Sorel et al.: "Journal American Chem. Society," vol. 80 (1958).

SAMUEL H. BELCH, *Primary Examiner.*